(12) United States Patent
Bowden et al.

(10) Patent No.: US 8,392,841 B1
(45) Date of Patent: Mar. 5, 2013

(54) WEB PAGE COMPOSITION TOOL WITH BROWSER PAGE SIZE GUIDE

(75) Inventors: Bruno Bowden, San Francisco, CA (US); Arthur Blume, Melrose, MA (US)

(73) Assignee: Google Inc., Mountain View, CA (US)

( * ) Notice: Subject to any disclaimer, the term of this patent is extended or adjusted under 35 U.S.C. 154(b) by 675 days.

(21) Appl. No.: 12/653,150

(22) Filed: Dec. 8, 2009

(51) Int. Cl.
*G06F 3/00* (2006.01)

(52) U.S. Cl. ........ 715/760; 715/733; 715/734; 715/735; 715/736; 715/744; 715/762

(58) Field of Classification Search .................. 715/733, 715/734, 735, 736, 744, 760, 762
See application file for complete search history.

(56) References Cited

U.S. PATENT DOCUMENTS

| 6,918,066 B2* | 7/2005 | Dutta et al. ..................... 714/46 |
| 7,584,435 B2* | 9/2009 | Bailey et al. .................. 715/788 |
| 2010/0211893 A1* | 8/2010 | Fanning et al. ............... 715/760 |

* cited by examiner

*Primary Examiner* — Michael Roswell
*Assistant Examiner* — Sajeda Muhebbullah
(74) *Attorney, Agent, or Firm* — Morgan, Lewis & Bockius LLP

(57) ABSTRACT

A computer-implemented method includes, on a client system, displaying a translucent overlay over a first web page displayed in a browser. A plurality of visually distinct sections of the first web page is displayed on the translucent overlay. Each section corresponds to a plurality of hypothetical browser sizes used to view the first web page. In each respective section a percentage corresponding to one of a portion of the community of users that can see or cannot see at least the respective section is displayed.

20 Claims, 20 Drawing Sheets
(2 of 20 Drawing Sheet(s) Filed in Color)

User Browser Sizes Information
Data Structure
203

| Session ID 219-1 | Browser Type 219-2 | Browser Version 219-3 | Browser Size 219-4 | Device 219-5 | Device OS 219-6 | Location 219-7 | Site Visited 219-8 | Timestamp 219-9 |
|---|---|---|---|---|---|---|---|---|
| 0001 | Chrome | 2.0.172.39 | 800 by 600 pixels | Desktop | Windows XP | Mountain View California United States | www.google.com | 12:01 pm |
| 0002 | Firefox | 3.5.2 | 1000 by 700 pixels | Laptop | Windows Vista | Los Angeles California United States | www.news.google.com | 4:03 pm |
| ... | ... | ... | ... | ... | ... | ... | ... | ... |

FIGURE 2A

User Statistics Database 116

Browser Size Statistics Data Structure
201

Width in pixels 242

| Height in pixels 243 | 0-50 | 51-100 | 101-150 | 151-200 | 201-250 | 251-300 | ... |
|---|---|---|---|---|---|---|---|
| 0-50 | 200 | 200 | 80 | 90 | 80 | 70 | ... |
| 51-100 | 200 | 200 | 80 | 90 | 80 | 60 | ... |
| 101-150 | 80 | 80 | 80 | 80 | 70 | 60 | ... |
| 151-200 | 80 | 80 | 65 | 66 | 60 | 60 | ... |
| 201-250 | 80 | 80 | 80 | 80 | 70 | 60 | ... |
| ... | | | | | | | |

User Statistics Database 116

Browser Size Statistics Data Structure 201

Sum of all all values for (0-50 by 0-50, 51-100 by 0-50, 0-50 by 0-50 and 0-50 by 51-100)

Sum of all all values for (0-50 by 0-50, 51-100 by 0-50, 101-150 by 0-50, 151-200 by 0-50, 201-250 by 0-50 and 251-300 by 0-50)

Width in pixels 242

| Height in pixels 243 | 0-50 | 51-100 | 101-150 | 151-200 | 201-250 | 251-300 | ... |
|---|---|---|---|---|---|---|---|
| 0-50 | 200 | 400 | 480 | 560 | 630 | 700 | ... |
| 51-100 | 400 | 800 | 960 | 1120 | 1260 | 1390 | ... |
| 101-150 | 480 | 960 | 1200 | 1425 | 1625 | 1815 | ... |
| 151-200 | 570 | 1140 | 1460 | 1751 | 2011 | 2261 | ... |
| 201-250 | 650 | 1300 | 1670 | 2051 | 2381 | 2691 | ... |
| ... | | | | | | | |

210-1, 210-2

WEB PAGE COMPOSITION TOOL WITH BROWSER PAGE SIZE GUIDE

TECHNICAL FIELD

The present invention relates generally to web page composition tools and more specifically to a web page composition tool for identifying valuable portions of a web page based on user browser sizes.

BACKGROUND

Typically, web designers design web pages on big monitors and view their web pages with large browsers. However, most computer users have small monitors and use browsers at small sizes. As a result, portions of a web page such as content, sign up buttons and advertisements are not immediately visible on a typical user's screen. A user may scroll to view additional portions of a web page but some users will get confused and exit the web page without realizing that they are missing important features of the web page. Accordingly, it would be highly desirable to have a web page composition tool.

SUMMARY

In some embodiments, a web page composition tool that enables a web designer to view which portions of a web page are visible to users is disclosed. A translucent overlay containing a plurality of distinct sections is displayed over a web page. The contents of the web page are visible through the translucent overlay. The size, shape and location of each distinct section of the translucent overlay corresponds to a plurality of browser sizes. A percentage value is displayed in each section representing the portion of a community of users that use a browser of a size at least as large as the smallest browser size associated with the section. By viewing the translucent overlay over a web page, a web designer can determine what portions of the web page users can view without having to scroll.

In some embodiments, a computer-implemented method includes, on a client system, displaying a translucent overlay over a first web page displayed in a browser. A plurality of visually distinct sections are displayed on the translucent overlay. Each section corresponds to a plurality of browser sizes that could be used to view the first web page. Each respective section displays a percentage value corresponding to one of a portion of the community of users that can see or cannot see at least a portion of a respective section.

In some embodiments, the first page is displayed within a second web page, the second web page including one or more controls. In some embodiments, the one or more controls include controls to allow a web designer to change an adjustable opacity level of the translucent overlay. In some embodiments, the one or more controls include controls to allow a web designer to navigate the first web page to designated web pages. In some embodiments, the one or more controls include controls to allow a web designer to resize the first web page to a respective size corresponding to a portion of the community of users that use the browser at the respective size or larger.

In some embodiments, a percentage number corresponding to a portion of the community of users that use a respective browser at the same size as the browser is displayed on the translucent overlay. In some embodiments, a grid is displayed on the translucent overlay.

In some embodiments, the visually distinct sections are non-overlapping. In some embodiments, each visually distinct section has a distinct color.

In some embodiments, an opening in the translucent layer is positioned below a cursor. The opening enables a user to interact with elements of the first web page shown in the opening.

In some embodiments, pixel gradations in association with grid lines to identify respective sizes of browser is displayed on the translucent overlay.

In some embodiments, the browser size statistics for the community of users are stored in a two dimensional array. In some embodiments, the percentage is determined from user statistics for the community of users, the statistics including a browser size for each respective user in the community of users.

In some embodiments, the size, shape and location of each distinct region is determined by browser size distributions for the community of users.

In some embodiments, a system includes memory, one or more processors and one or more programs stored in the memory and configured for execution by the one or more processors. The one or more programs include instructions for displaying a translucent overlay over a first web page displayed in a browser. The one or more programs include instructions for displaying a plurality of visually distinct sections on the translucent overlay. Each section corresponds to a plurality of hypothetical browser sizes used to view the first web page. The one or more programs include instructions for displaying a percentage values corresponding to one of a portion of the community of users that can see or cannot see at least a portion of a respective section.

In some embodiments, a computer readable storage medium stores one or more programs configured to be executed by a computer system. The one or more programs include instructions for displaying a translucent overlay over a first web page displayed in a browser. The one or more programs include instructions for displaying a plurality of visually distinct sections on the translucent overlay. Each section corresponds to a plurality of hypothetical browser sizes used to view the first web page. The one or more programs include instructions for displaying a percentage corresponding to one of a portion of the community of users that can see or cannot see at least a portion of a respective section.

BRIEF DESCRIPTION OF THE DRAWINGS

The patent or application file contains at least one drawing executed in color. Copies of this patent or patent application publication with color drawings will be provided by the Office upon request and payment of the necessary fee.

FIGS. 2A, 2B-1, 2B-2, 2C-1, 2C-2, 2C-3, 2D-1, 2D-2, 2D-3 and 2D-4 depict data structures associated with various components of the client-server environment according to some embodiments of the invention.

Like reference numerals refer to corresponding parts throughout the drawings.

DESCRIPTION OF EMBODIMENTS

Methods and systems for a web composition tool are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

Figure 1A:
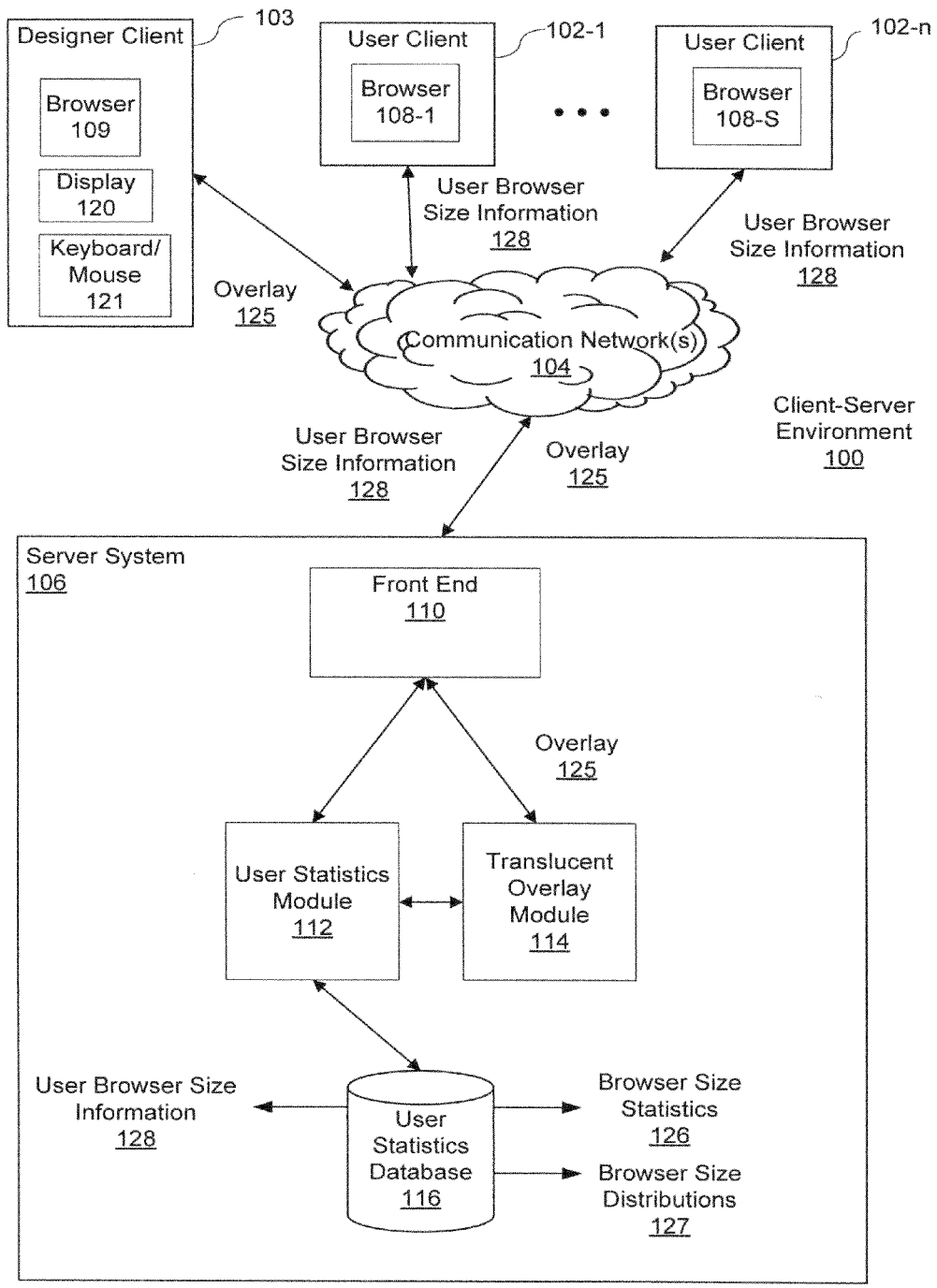
FIG. 1A-1B are block diagrams illustrating the infrastructure of a client-server environment in accordance with some embodiments of the invention.

FIG. 1A is a block diagram illustrating the infrastructure of a client-server environment 100 for implementing some of the embodiments of the invention. The client-server environment 100 includes: one or more user client devices 102, one or more designer client devices 103, a communication network 104 and a server system 106. The server system 106 is coupled to the one or more user client devices 102 and the one or more designer client devices 103 by a communication network 104.

It should be appreciated that the server system 106 may be implemented as a distributed system of multiple computers. However, for convenience of explanation, the server system 106 is described below as being implemented on a single computer, which can be considered a single logical system.

The communication network(s) 104 can be any wired or wireless local area network (LAN) and/or wide area network (WAN), such as an intranet, an extranet, or the Internet. It is sufficient that the communication network 104 provides communication capability between the designer client devices 103, user client devices 102 and the server system 106. In some embodiments, the communication network 104 uses the HyperText Transport Protocol (HTTP) to transport information using the Transmission Control Protocol/Internet Protocol (TCP/IP). HTTP permits user client devices 102 and designer client devices 103 to access various resources available via the communication network 104. The various embodiments of the invention, however, are not limited to the use of any particular protocol.

In some embodiments, the server system 106 includes a front end 110, a user statistics module 112, a user statistics database 116 and a translucent overlay module 114. In some embodiments, the server system 106 receives requests for translucent overlays 125 from the designer client devices 103, generates a translucent overlay 125 and returns the translucent overlay 125 to the designer client device 103. In some embodiments, the server system 106 receives a request for a translucent overlay data from a designer client 103 and returns translucent overlay data to the designer client device 103. The designer client 103 uses the translucent overlay data to generate a translucent overlay 125 to display at the designer client 103. The server system 106 also receives and stores user browser size information 128 in the user statistics database 116.

A translucent overlay, as described herein, is a translucent or transparent layer that allows web page content underneath the overlay to be visible. In some embodiments, the translucent overlay consists of one or more inline frames, iframes, webpages, frames or divs. An inline frame is an HTML element that allows an HTML document to be inserted into another HTML page. For example, a window displayed within a webpage that displays a second webpage. A web page may contain several independently controlled iframes, each iframe displaying a different document. In some embodiments, the translucent overlay is an application window that is placed over the portion of a web browser that displays content. In a web page containing multiple frames, the translucent overlay can be placed on top of some frames but not others. In some embodiments, a translucent overlay consists of multiple divs. A div is an HTML element that defines division or a section of an HTML document. In some embodiments, a translucent overlay consists of a single div. It is noted that a div is not a separate web page. Thus, a translucent overlay consisting of one or more divs displayed over a first web page is a part of the first web page. The opacity of the translucent overlay can be adjusted from transparent to opaque.

In some embodiments, a translucent overly is employed to illustrate, for a web designer, what percentages of users are likely to be able to view different portions of a website under development. Using the composition tool, a web designer can concurrently view portions of a web through a translucent overlay and information displayed on the translucent overlay. In some embodiments, the translucent overlay includes distinct sections corresponding to hypothetical browser sizes and percentages in each section that indicate the portion of users with a hypothetical browser size. The percentage indicates the portion of users that can see or cannot see a portion of a web page displayed through a respective distinct section of the translucent overlay. For example, a web designer can, using the composition tool, determine that 90% of the users can view a certain portion of a web page under development. Web designers often develop web pages on large monitors and view their web pages with web browsers set at large sizes. However, most users have small monitors and view web pages with web browsers set at small sizes. As a result, large portions of a web page such as advertisements, content, or graphical user interface elements (e.g., button, text fields, menus and the like) may not be visible to a user when the user initially views a web page. Some users may scroll to view additional portions of the web page but some users will get confused and exit the web page instead of scrolling without realizing that they are missing important features of the web page.

In some embodiments, a web designer can tailor a translucent overlay by choosing what statistics are used to generate the overlay. A web designer may only be interested in the browser sizes of a certain community of users. For example, users in a certain location, using certain devices, using certain web browser or users who visit certain web sites. In addition, a web designer may only be interested in statistics for a certain period of time. Thus, a web designer can employ the composition to tool to ensure that a large percentage of the web designer's intended audience can view portions of a webpage without scrolling.

In some embodiments, a web designer can interact with a web page displayed underneath a translucent overlay. In some embodiments, an opening in the translucent overlay is positioned under a cursor. As the cursor moves, the opening is automatically repositioned under the cursor. In some embodiments, the translucent overlay consists of multiple divs that are positioned to create an opening underneath the cursor. The opening can be of any size or shape. The opening allows a user to interact with the web page underneath the translucent overlay using the cursor. In some embodiments, a web designer can resize the opening and position the opening on a portion of the translucent overlay. In this example, the opening does not move unless the user moves it.

The server system 106 collects user browser size information 128 from the one or more user clients 102 and stores the user browser size information 128 in the user statistics database 116. In some embodiments, user browser size information 128 is sent to the server system 106 when a user visits a specific website containing a browser size information collection javascript application. In some embodiments, the user browser size information 128 includes (as shown in FIG. 2A, 221, 222) a session id, a browser type, a browser version, a browser size, a device type, the device operation system, location information, site visited and timestamp of the site visit. A browser type is the type of browser used by a user such as Google Chrome or Mozilla Firefox. In some embodiments, browser size is the pixel size (width and height) of the area of a web browser that is available to a web site when the web site is being viewed. Stated in another way, browser size is the size of the area of the web browser that displays a website. For example, a browser may be 900 pixels by 800 pixels. In some embodiments, the browser size excludes the size of the area containing menus and buttons and the size of the border of the browser application. It is noted that the browser size is a different measurement than screen resolution size. The screen resolution size measures the number of distinct pixels in each dimension (height and width) that can be displayed on a user's monitor. A browser size can be any size less than or equal to the screen resolution size. The device type is the type of device used by the user to run the browser. For example, the device could be a desktop computer, netbook, mobile phone, tablet device, laptop or the like. In some embodiments, the device type includes the make (e.g., Apple) and model (e.g., Macbook) of the respective device. The location information includes the city, county, state and country of the user. In some embodiments, the location information is determined from the IP address of the user client 102. The site visited is the site the user visited when the user's browser size information was collected. The timestamp is the time at which the user browser size information 128 was collected.

In some embodiments, the user browser size information 128 is collected when a user of a user client 102 visits a specific web page. The specific web page includes a javascript application that collects the user browser size information 128 and sends it to the server system 106.

Figures 1, 2B:
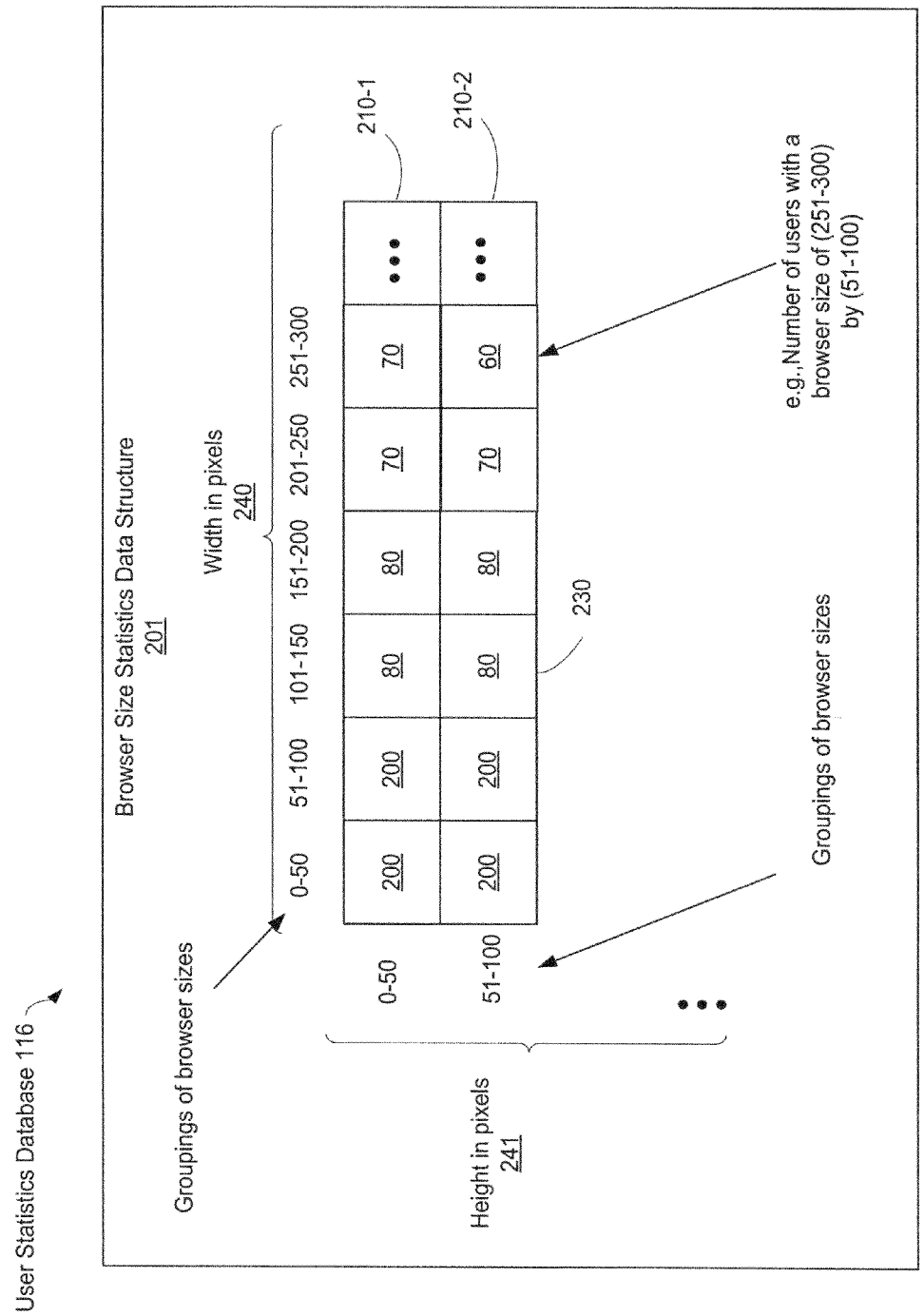

In some embodiments, the user statistics module 112 uses user browser size information 128 stored in the user statistics database 116 to generate browser size statistics 126 and browser size distributions 127. In some embodiments, browser size statistics 126 are the number of users with a particular browser size or with a browser size at least as large as a particular browser size. For example, 50 users may have a 900 pixel by 500 pixel browser or have a browser size that is at least as large as 900 by 500 pixels. In some embodiments, the user browser size statistics 126 are stored in the user statistics database 116. In some embodiments, as shown in FIG. 2B, the user browser size statistics 126 is stored as a two dimensional array (FIGS. 2B-1, browser size statistics data structure 201).

In some embodiments, the user statistics module 112 uses browser size statistics 126 to generate browser size distributions 127. In some embodiments, a browser size distribution 127 is the portion of the community of users that have at least a respective browser size. In some embodiments, the browser size distribution 127 is the portion of the community of users that have a particular browser size or at least a particular browser size. For example, 10% of the users may have a browser size of 900 pixels by 500 pixels or have a browser size that is at least as large as 900 pixels by 500 pixels. In some embodiments, the user statistics module 112 uses user browser size information 128 to generate the browser size distributions 127. In some embodiments, the translucent overlay module 114 uses browser size statistics 126 or user browser size information 128 to generate the browser size distributions 127. In some embodiments, the browser size distributions 127 are stored in the user statistics database 116. In some embodiments, the browser size distributions 127 are stored as a two dimensional array (FIGS. 2D-1, browser size distribution data structure 202). As discussed in more detail below, the translucent overlay module 114 uses browser size statistics 126 to determine the size, shape and location of distinct regions of a translucent overlay.

The browser size statistics 126 and browser size distributions 127 correspond to a community of users. The community of users can be any grouping of users that share a common characteristic. For example, the community of users could be users of a particular web site, users from a particular location (e.g, city, state, country or region), users using a certain device (e.g., netbook, mobile phone, desktop, tablet, laptop), users using a certain device make and model, users using a certain application, users using a certain operating system, or users having an IP address within a certain range of IP addresses or any suitable combination of such criteria. In some embodiments, definitions defining community of users are stored in the user statistics database. For example, there may be a definition corresponding to desktop computer users in Mountain View, Calif.

The browser size statistics 126 and browser size distributions 127 can be generated for any period of time. For example, the browser size statistics 126 and browser size distributions 127 can be generated for an hour, day, week, month, year. In some embodiments, browser size statistics 126 and browser size distributions 127 are generated for a period of time between two points of time. For example, the period of time could be over a week period in the month of March.

The front end 110 provides an interface between the server system 106 and the client devices 102 and 103. The front end 110 is configured to receive user browser size information 128 from the user client devices 102. In some embodiments, the user browser size information 128 is stored in the user statistics database 116. The front end 110 is also configured to receive requests for translucent overlays and to send translucent overlays 125 to the designer client devices 103. In some embodiments, the front end 110 is configured to receive requests for translucent overlay data and to send translucent overlay data to the designer client devices 103.

The user statistics database 116 stores user browser size information 128, browser size statistics 126 and browser size distributions 127 for a community of users. In some embodiments, the server system 106 includes multiple user statistics databases 116, or the user statistics database 116 is partitioned, with each partition storing or database storing browser size information 128, browser size statistics 126 and browser size distributions 127 corresponding to a respective community of users. For example, there may be a database or partition of a database storing user browser size information 128, browser size statistics 126 and browser size distributions 127 for mobile phone users, users in California or users of mobile phones in California. Optionally, each partition or database may store user browser size information 128, browser size statistics 126 and browser size distributions 127 corresponding to any predefined period of time such as a day, month or year. For example, a partition or database may store browser size statistics or browser size distributions corresponding to user browser information collected during the previous month.

The user statistics module 112 maintains at least some of the user browser size information 128, browser size statistics 126 and browser size distributions 127 in the user statistics database 116. In some embodiments, the user statistics module 112 uses user browser information 128 stored in the user statistics database 116 to determine browser size statistics 126 and browser size distributions 127. As described in more detail below, the translucent overlay module 114 in part uses browser size statistics 126 and browser size distributions 127 stored in the user statistics database 116 to generate translucent overlays 125.

Figure 4A:
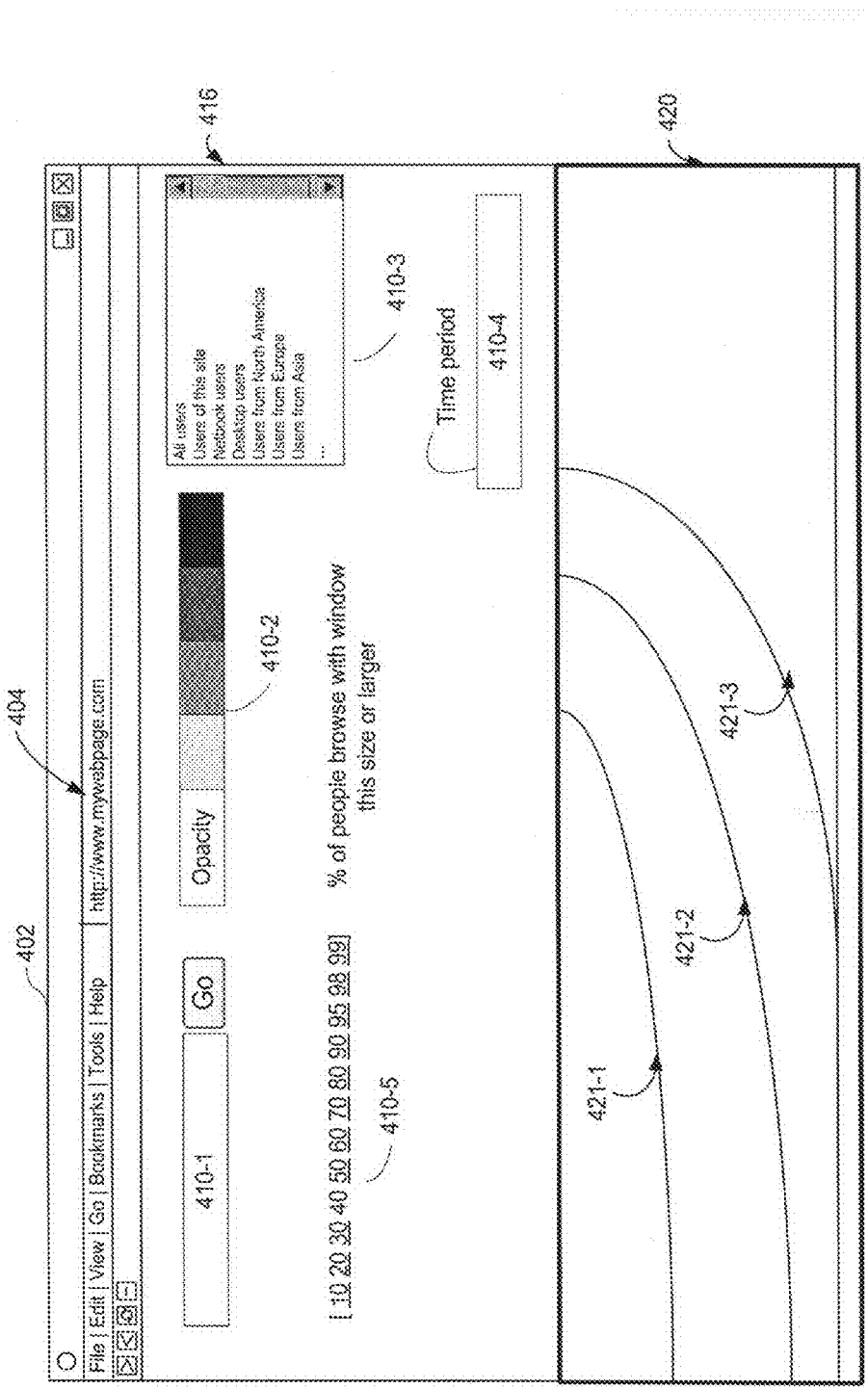
FIGS. 4A-4C are exemplary screenshots according of the web page composition tool according to some embodiments of the invention.
Figure 4B:

The translucent overlay module 114 is configured to generate translucent overlays 125. To generate a translucent overlay, the translucent overlay module 114 obtains or determines user browser size distributions for each respective browser size or groups or browser sizes. As discussed previously, the translucent overlay may consist of one or more web pages, frames, iframes or divs. In some embodiments, the translucent overlay module 114 uses the browser size distributions 127 to determine size, shape and location of distinct regions of the translucent overlay and percentage values for each distinct region. In some embodiments, the shape of each distinct region roughly corresponds to the difference in size of two browsers (FIG. 4B, 424, 422). Each distinct region represents one or more browser sizes used by a community of users. The percentage value corresponds to the portion of the community of users that have a browser at a size that is at least as large as the largest browser in a distinct section.

In some embodiments, the translucent overlay module 114 retrieves browser size distributions 127 from the user statistics database 116. In some embodiments, the translucent overlay module 114 retrieves browser size statistics 126 and/or user browser size information 128 from the user statistics database 116 and determines the browser size distribution 127 for each respective browser size or groups of browser sizes. The browser size statistics 126 and browser size distributions 127 used by the translucent overlay module 114 can correspond to any community of users discussed above. For example, a translucent overlay 125 may be generated for users of a particular website, users living in a particular location such as California, or users using a particular device such as netbook. The browser size statistics 126 and browser size distributions 127 used by the translucent overlay module 115 may also correspond to any predefined period of time such a day, week, month or year.

Once the translucent overlay module 114 obtains the browser size distributions 127, the translucent overlay module 115 determines size, shape and location of each distinct region of the translucent overlay. In some embodiments, the size, shape and location of each distinct region of the translucent overlay is determined by using browser size distributions 127. As discussed in further detail below, the translucent overlay creates a table of browser size distributions with each slot corresponding to a browser size or groups of browser sizes. Slots are grouped according to their values, for example in ranges such as 0-10%. The size, shape and location of the groups of browser size distribution slots form the size, shape and location of a respective distinct region of a translucent overlay. Each distinct region also corresponds to a plurality of hypothetical browser sizes used by a community of users. For example, a respective section may correspond to browser sizes of 900 pixels by 350 pixels to 900 pixels by 600 pixels. Optionally, the translucent overlay includes grid lines and pixel gradations to identify respective sizes of browsers.

After the size, shape and location of each distinct section of the translucent overlay is determined, the translucent overlay module 115 associates a percentage value with each distinct region. The percentage value is the portion of users having browser sizes at least as large as the smallest browser size of a respective distinct region. For example, 80% of the users may have a browser size at least as large as 900 by 400 pixels. It is noted for a respective region, the percentage also indicates the portion of users who can view the area covered by the smallest browser size of the respective region. In some embodiments, the translucent overlay module 114 determines the percentages, uses them and then disposes of them without storing the percentages in the user statistics database 116.

In some embodiments, the translucent overlay module 114 is configured to generate a translucent overlay 125 and then send the translucent overlay 125 to a designer client 103. In some embodiments, the translucent overlay module 114 sends browser size distributions 127 to the designer client 103. The designer client 103 uses the browser size distributions 127 to generate a translucent overlay 125.

A web designer interfaces with the server system 106 and views the translucent overlay at a designer client device 103. The client devices 102 and 103 may be any suitable computer devices that are capable of connecting to the communication network 104, such as computers, desktop computers, laptop computers, tablet devices, netbooks, internet kiosks, personal digital assistants, mobile phones, gaming devices, or any other device that is capable of receiving documents and document links from the server system 106. The client devices 102 and 103 typically include one or more processors, non-volatile memory such as a hard disk drive and a display. The client devices 102 and 103 may also have input devices such as a keyboard and a mouse (not shown).

A respective client 102 and 103 may contain at least one browser application 108 for receiving documents and translucent overlays 125 from the server system 106. The browser application 108 and 109 can be a software application that permits a user to interact with the clients 102 and 103 and/or network resources to perform one or more tasks. For example, the browser application 108 can be a browser (e.g., Google Chrome) or other type of application that permits a user to search for, browse, and/or use resources (e.g., web pages and web services) identified by a URL (universal resource locator). Similarly, the term "URL" means a network address or location of a document. In this context, the term "document" means any document or content of any format including, but not limited to, text, image, audio, video, etc., that may be used by a web browser or other applications.

Figure 1B:
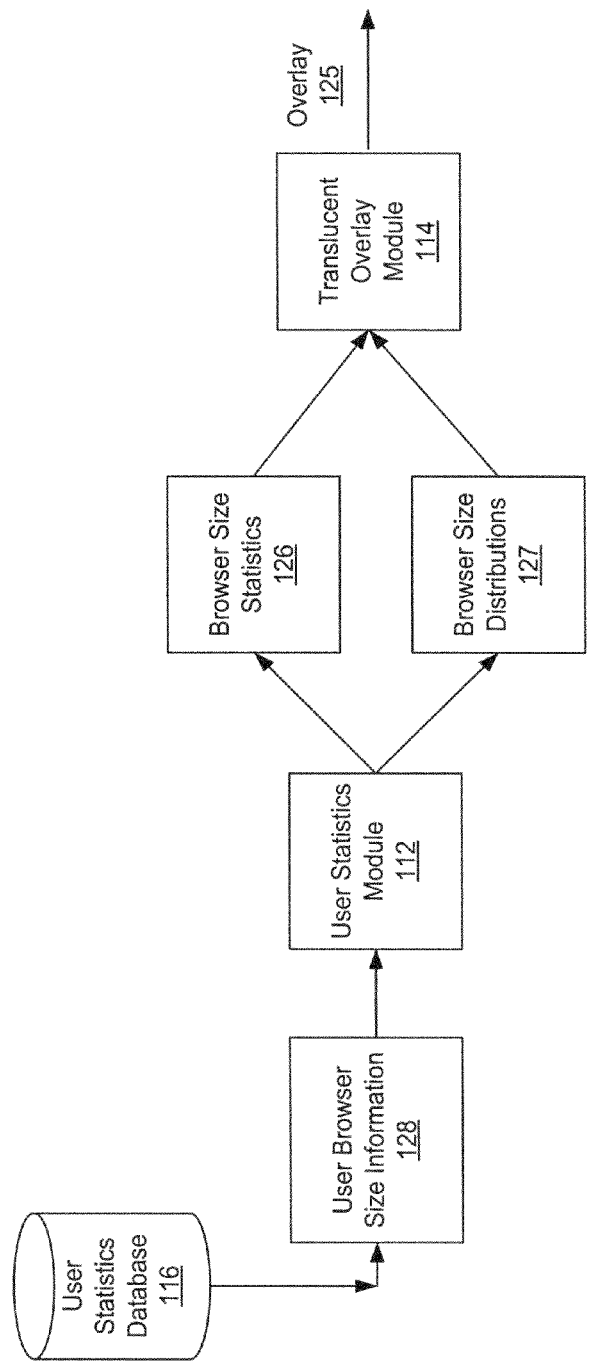

Attention is now directed to FIG. 1B which illustrates an overview of the process of generating translucent overlays 125. The user statistics module 112 uses user browser size information 128 stored in the user statistics database 116 to generate browser size statistics 126 and browser size distributions 127. In some embodiments, the user statistics module 112 generates the browser size statistics 126 by counting, from the user browser size information 128, the number of users that use a browser at least as large as a respective browser size. In other words, for each respective browser size, the number of users using a browser of at least the respective browser size is determined. For example, fifty users may use a browser of at least 900 pixels by 500 pixels. In some embodiments, the user statistics module 112 determines the number of users with each respective browser size. In some embodiments, the user statistics module 112 uses the browser size statistics 126 to generate the browser size distributions 127 by determining the distribution of browser sizes. In other words, for each respective browser size the portion of a community of users with at least a respective browser size is determined. For example, 5% of the users may have a browser size of at least 900 pixels by 500 pixels.

The browser size statistics 126 and browser size distributions 127 used by the translucent overlay module 114 correspond to any community of users discussed above. For example, a translucent overlay may be generated for users of a particular website, users living in a particular location such as California, users using a particular web browser, or users using a particular device such as netbook. The browser size statistics 126 and browser size distributions 127 used by the translucent overlay module 115 may also correspond to any predefined period of time such as a day, week, month or year.

In some embodiments, the translucent overlay module 114 uses browser size statistics 126 and/or browser size distributions 127 to determine the size, shape and location of distinct regions of a translucent overlay and to provide percentage values to each distinct region.

Attention is now directed to FIG. 2A which illustrates user browser size information data structure 203, stored in the user statistics database (FIG. 1A, 116), for storing user browser size information 128 for a community of users in accordance with some embodiments. In some embodiments, the user browser size information data structure 203 is created and maintained by the user statistics module (FIG. 1A, 112). In some embodiments, the user browser size information data structure 203 includes session id 219-1, browser type 219-2, browser version 219-3, browser size 219-4, device type 219-5, device operation system 219-6, location 219-7, site visited 219-8 and timestamp 219. A browser type is the type of browser used by the user such as Google Chrome or Mozilla Firefox. In some embodiments, browser size is the pixel size (width and height) of the area of a web browser that is available to a web site when the web site is being viewed. Stated in another way, browser size is the size of the area of the web browser that displays a website. For example, a browser size may be 900 pixels by 800 pixels. In some embodiments, the browser size excludes the size of the area containing menus and buttons and the size of the border of the browser application. In some embodiments, exact browser sizes are not stored, instead browser sizes are rounded up. For example, a height of 908 is rounded to 910. Any increment can be used for the rounding. The device type is the type of device used by the user to run the browser application. For example, a desktop computer, netbook, mobile phone, tablet device or laptop. In some embodiments, the device type includes the make and model of the respective device. The device operating system is the operating system on the user's device used to run the browser application. The location information includes the city, state, county and country of the user. In some embodiments, the location information is determined from the IP address of the user. The site visited is the web site visited by the user when the user browser information was collected. The timestamp is the time at which the user browser size information is collected. In some embodiments, the user browser size information 128 is collected when a user of a user client 102 visits a specific web page. The specific web page includes a javascript application that collects the user browser size information and sends it to the server system (FIG. 1A, 106).

Figures 2, 2B:
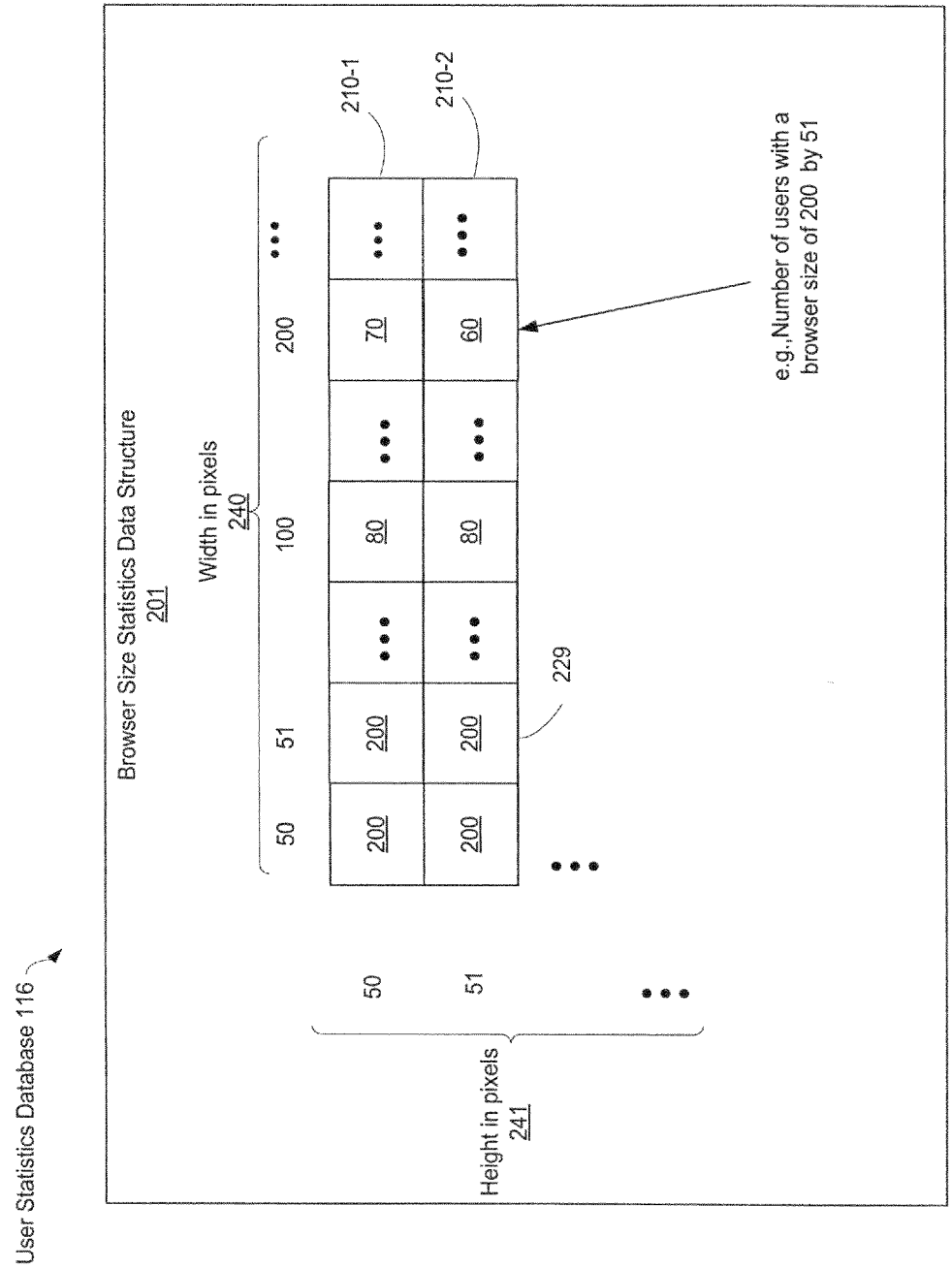

Attention is now directed to FIGS. 2B-1 which illustrates a browser size statistics data structure 201, stored in user statistics database 116, for storing browser size statistics 126 for a community of users in accordance with some embodiments. In some embodiments, the user statistics database (FIG. 1A, 112) uses browser size information from the user browser size information data structure (FIG. 2A, 203) to generate the browser size statistics data structure 201. In some embodiments, user statistics data structure 201 is a two-dimensional array with each position or slot storing one or more statistics for a respective browser size or groups of browser sizes. In some embodiments, as shown in FIGS. 2B-2, the browser size statistics data structure 201 includes a slot for each respective browser size. Each slot contain the number of users with a respective browser size. In some embodiments, as shown in FIGS. 2B-1, the browser size statistics data structure 201 includes a slot for groupings of browser sizes. For example, as shown in FIGS. 2B-1, a slot 230 may contain browser size statistics for users having browser sizes of 101-150 by 51-100 or at least 101-150 by 51-100. In this example, browser size statistics for browser sizes 102 by 52, 125 by 75 and 150 by 100 would all go in slot 230. Any grouping of browser sizes can be used. It is noted that the numbers in FIGS. 2B-1 and 2B-1 are exemplary.

Figures 2, 2C:
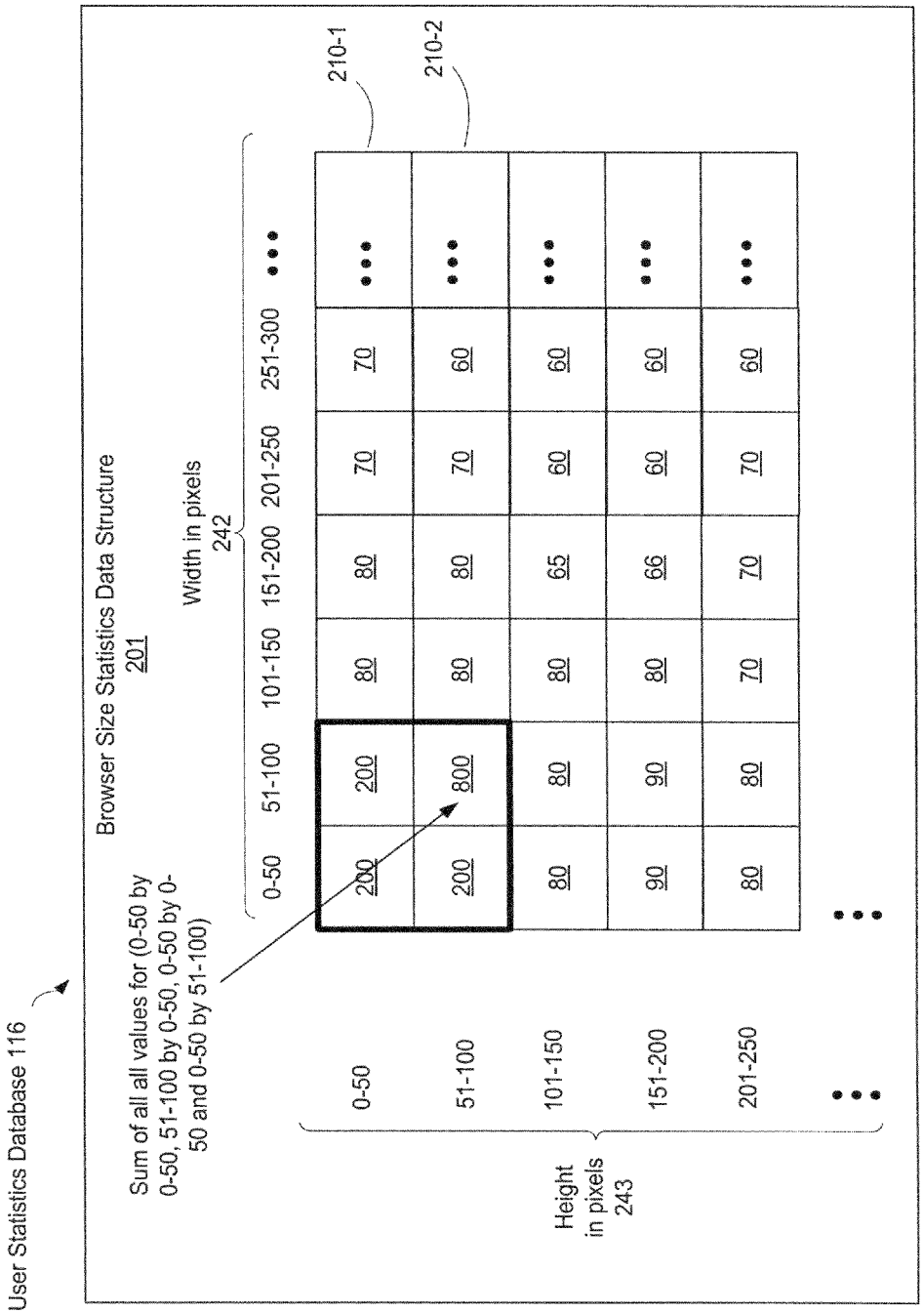

FIGS. 2C-1, 2C-2 and 2C-3 illustrate a browser size statistics data structure 201 and how it is processed to produce a browser size distribution data structure 202. It is noted that a browser size statistics data structure 201 and a browser size distribution data structure 202 are distinct data structures. In some embodiments, the user statistics module (FIG. 1A, 112) uses the browser size statistics (FIG. 1A, 126) stored in the user statistics database (FIG. 1A, 116) to generate the browser size distribution data structure 202. In some embodiments, the user statistics module retrieves a browser size statistics data structure 201 or a copy of the browser size statistics data structure 201 to generate the browser distribution data structure 202. In some embodiments, as shown in FIGS. 2C-1, the browser size statistics data structure 201 is a two-dimensional array with each position or slot storing one or more statistics for a respective browser size or groups of browser sizes.

Figures 1, 2D:
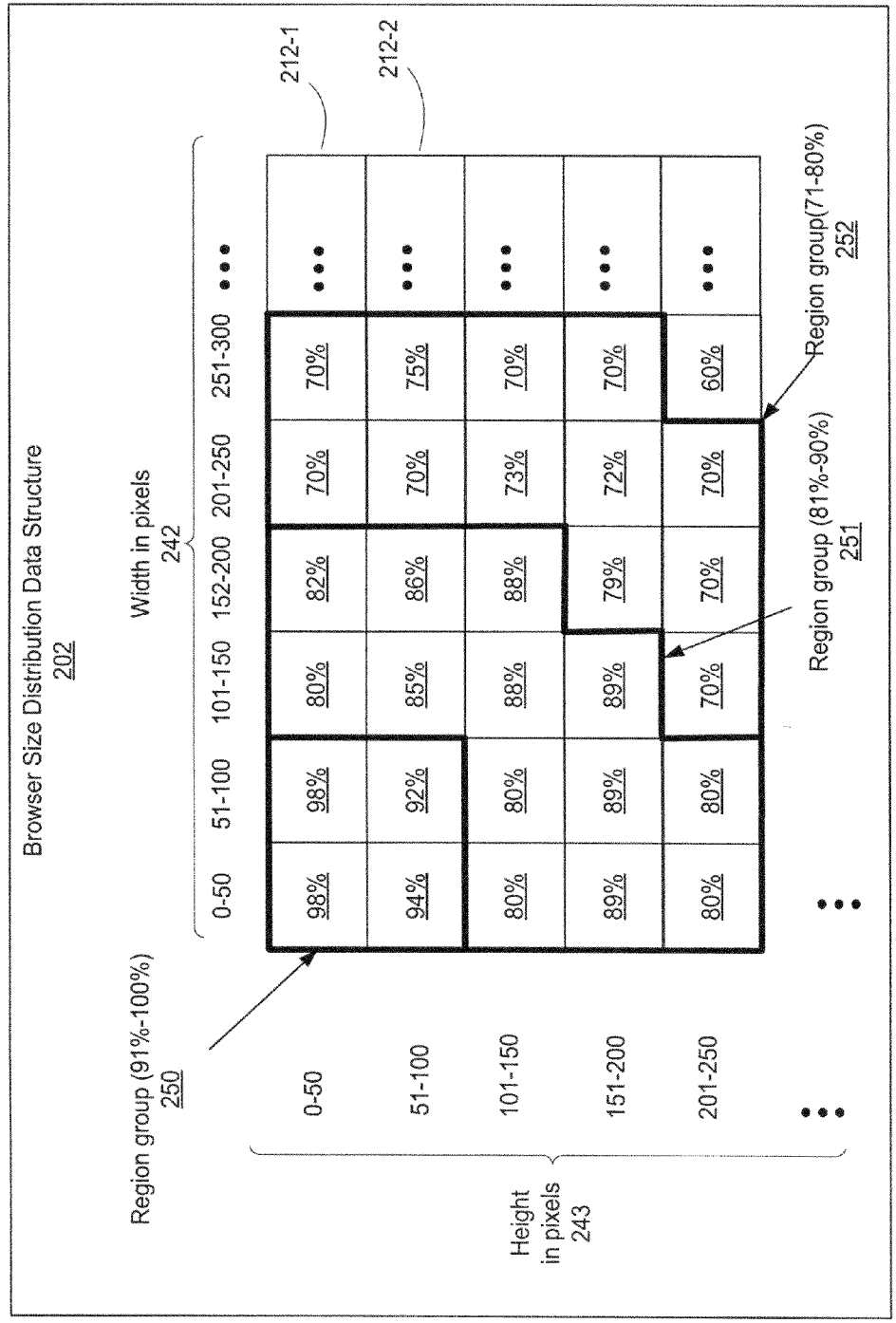
Figures 2, 2D:
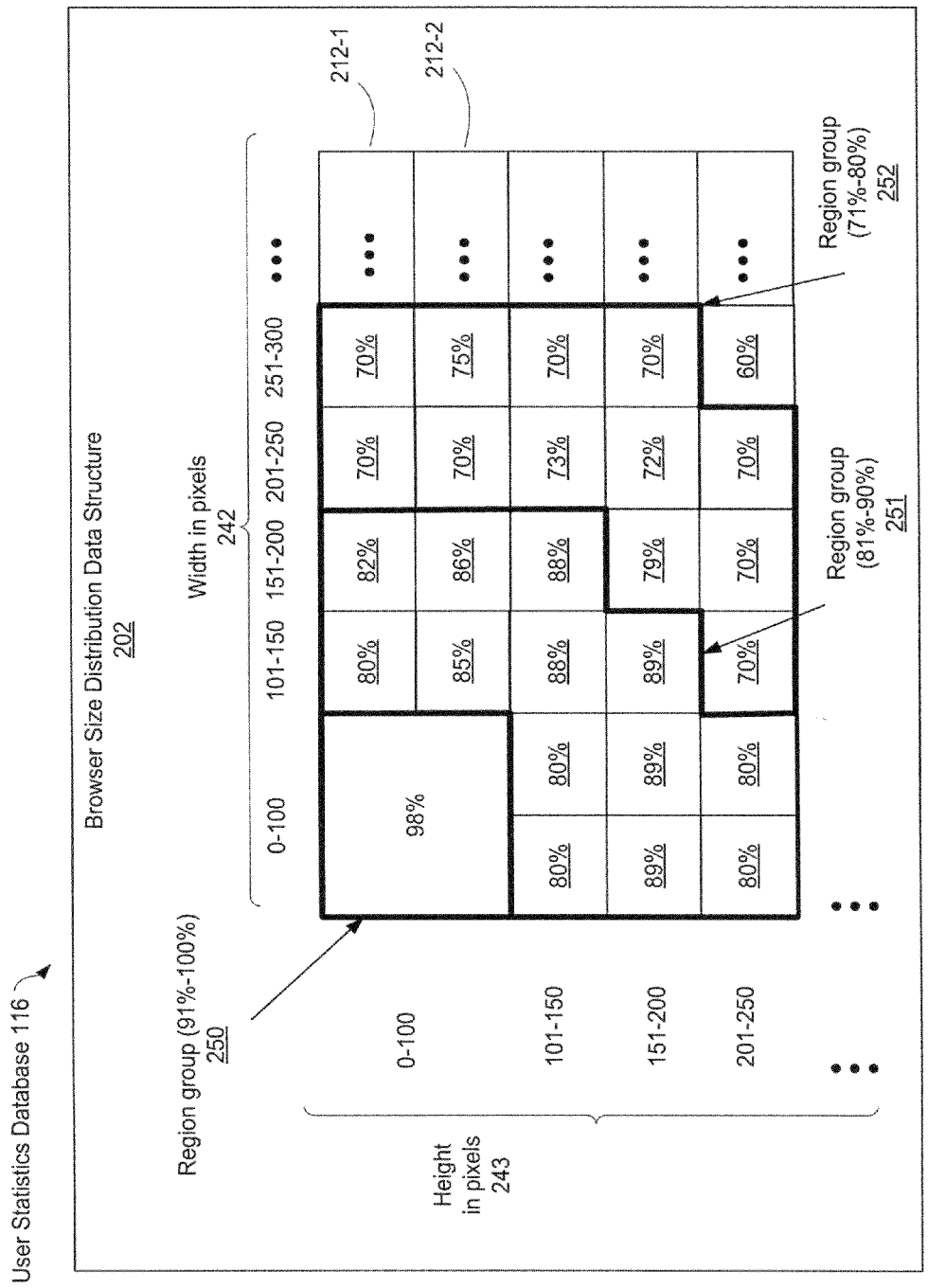
Figures 2, 2D, 3:
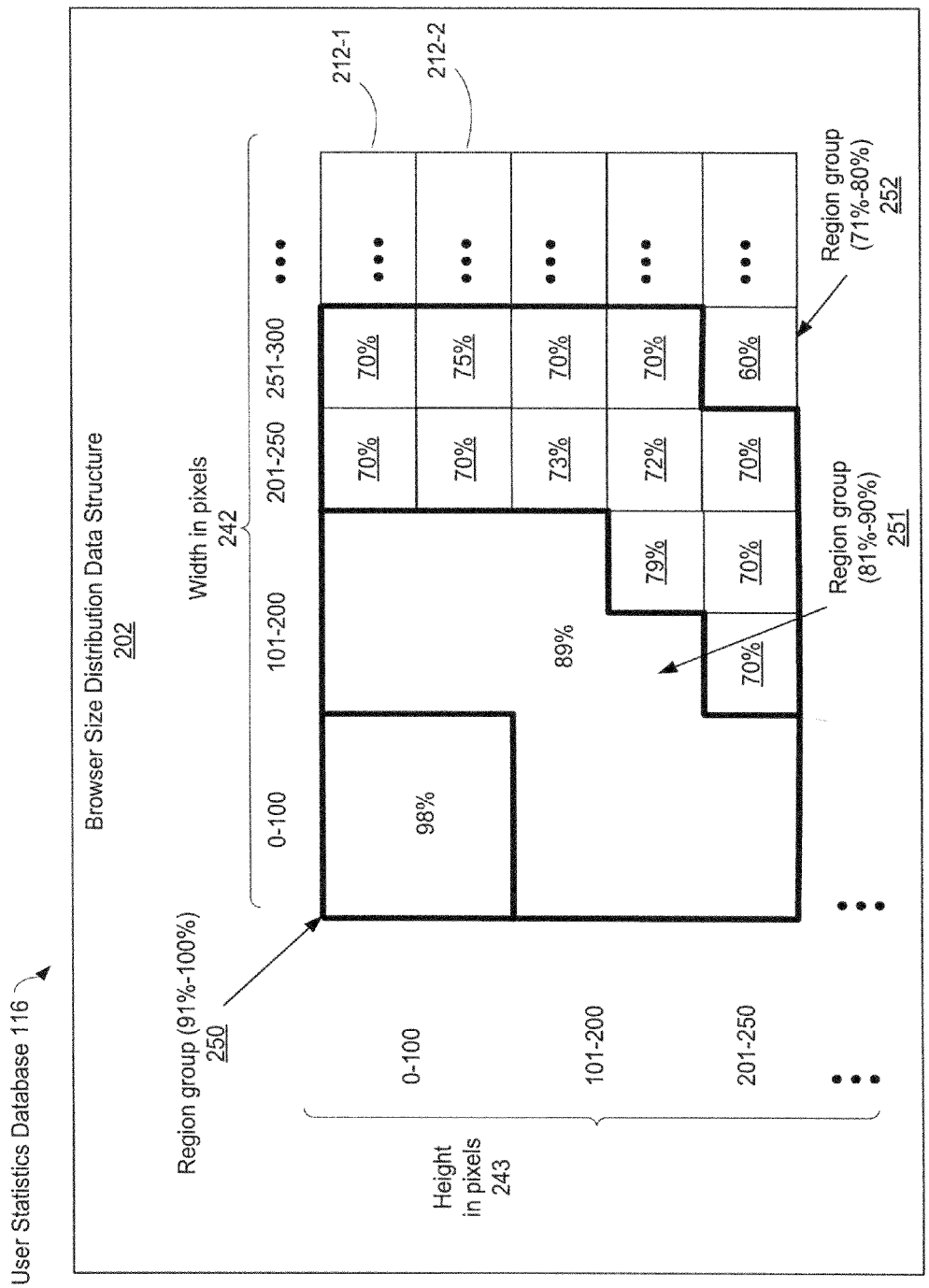
Figures 2, 2D, 3, 4:
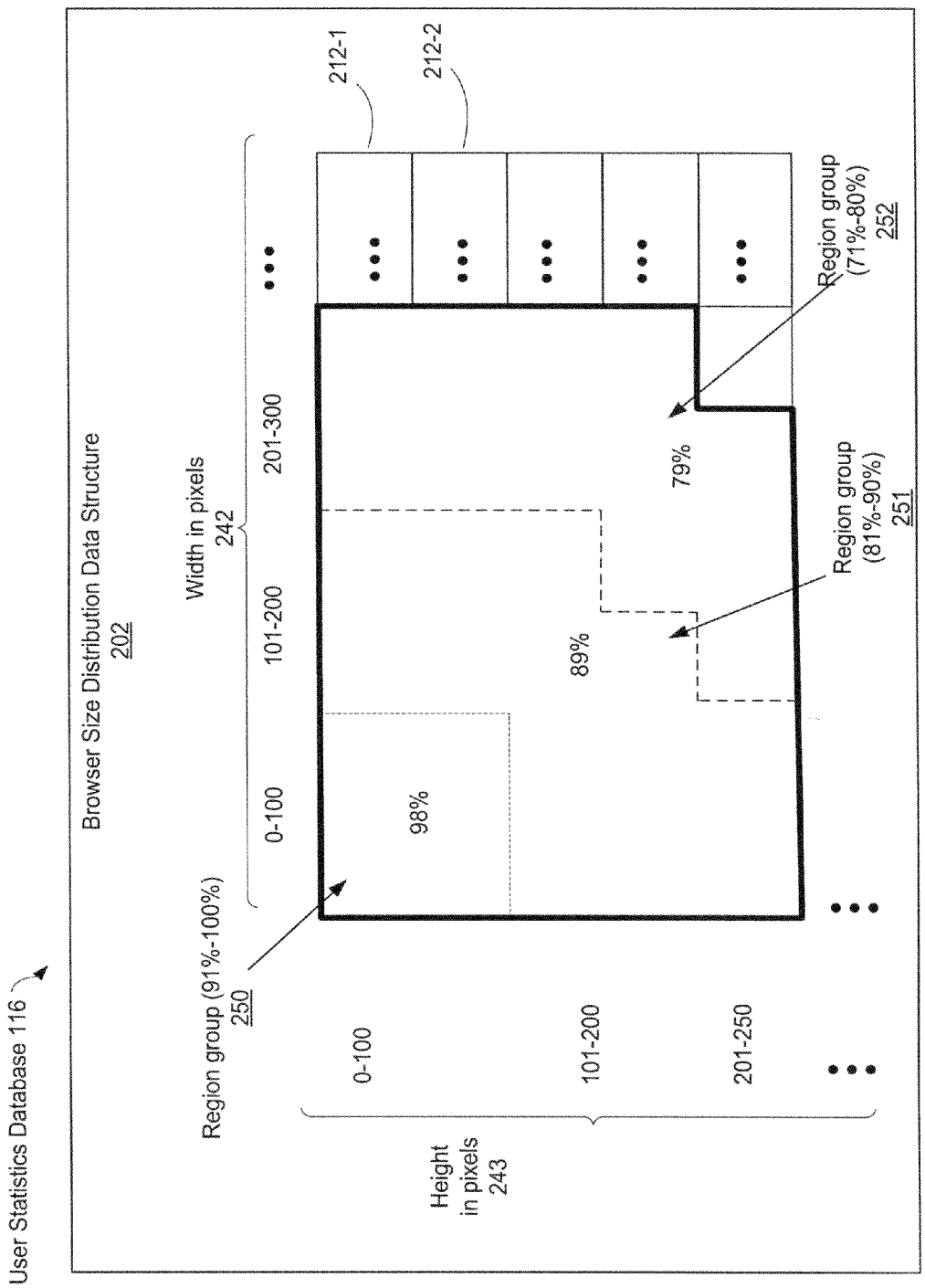

Initially, a browser distribution data structure 202 may contain identical values to a browser size statistics data structure 201. In some embodiments, the values of the browser size statistics data structure 201 are copied to a temporary data structure for processing. After processing the values from the temporary data structure are copied or transferred to the browser distribution data structure 202. To generate the browser distribution data structure 202, it is determined for each browser size group or browser size the number of users having a browser size smaller than the respective browser size group or browser size. Stated in another way, each slot in the holds the number of all users having a browser size smaller than or equal to the browser size or sizes corresponding to respective slot. In other words, for a respective slot the values of all of the slots to the left and above the respective slot is added to the value of the respective slot. For example, as shown in FIGS. 2C-2, the value contained in the slot corresponding to 51-100 by 51-100 is generated by adding the browser size statistics for slots 0-50 by 0-50, 0-50 by 51-100, 51-100 by 0-50 and 51-100 by 51-100. In the example, 800 users have a browser size smaller than 100 by 100. In other words, 800 users cannot see the content at position 100 by 100. As shown in FIGS. 2C-3, every slot is updated to include the total number of users with a browser size equal to or smaller than the browser size or sizes corresponding to the respective slot. It is noted that each value is only counted once. Thus, when updating the value of a respective slot, the calculation only considers the original values of the browser size statistics database structure 201 for slots equal to or smaller than the browser size of the respective slot. In some embodiments, each slot holds the number of users having a browser size greater than or equal to the browser size corresponding to the respective slot.

Once each slot is updated to contain the total number of users with small browsers, the distribution is calculated for each browser size or group of sizes. The distribution value for each slot is determined by dividing the value contained in each slot by the total number of users of the system. The calculated distribution value indicates the portion of the community of users that cannot see a given point. For example, if a distribution value of 2% for a slot 0-50 pixels by 0-50 pixels indicates that 2% of the users could not see the point at 50 by 50 pixels. The calculated distribution value also indicates the portion of the community of users that have a browser size at least as large as the browser size corresponding to the respective slot by calculated the difference between the percentage value and 100%. Using the previous example for slot 0-50 by 0-50 pixels the difference between 2% and 100% is 98%, thus 98% of the users have a browser size at least as large as 0-50 by 0-50 pixels. After each slot is updated the table is saved as a browser size distribution data structure 252. FIGS. 2D-1 shows the resulting browser size distribution data structure 202. It is noted that, in FIGS. 2D-1, the distribution values contained in each slot represents the portion of users that have a browser size at least as large as a size corresponding to a respective slot. As shown in FIGS. 2D-1, each slot contains a percentage value indicating the portion of users that have a browser size smaller than a respective browser size. In other words, the percentage value indicates the portion of users that cannot see a respective position on a web page.

The information contained in the data structures described in FIGS. 2A, 2B, 2C and 2D can correspond to any community of users discussed above and to any predefined period of time. In some embodiments, user statistics database 116 stores multiple two-dimensional arrays, each storing browser size statistics data structure 201 or browser size distribution statistics data structure 202 corresponding to a community of users, predefined period of time or any suitable combination of such criteria.

Figure 3A:
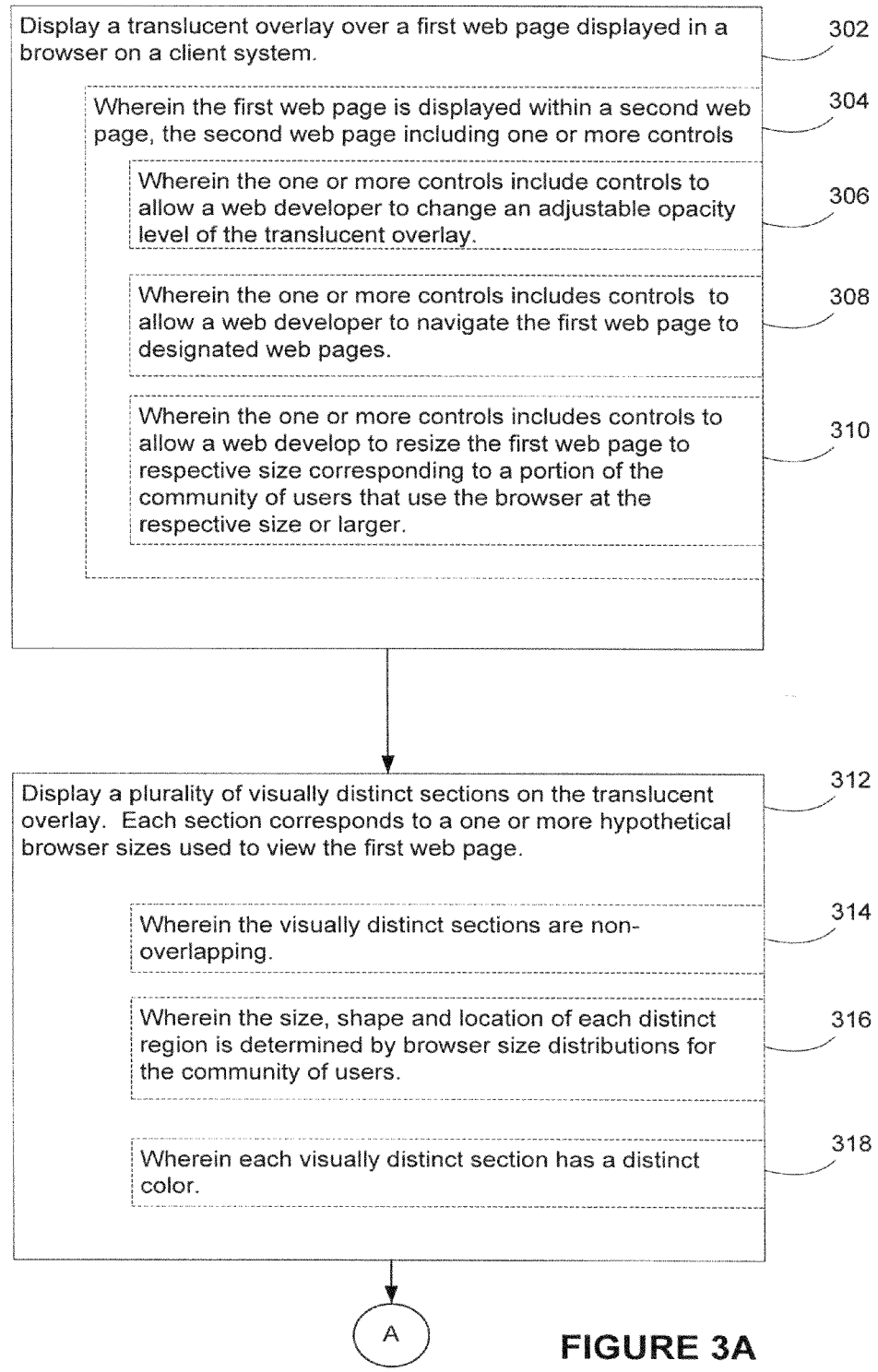
FIGS. 3A-3B are flow chart diagrams illustrating a process to generate the web page composition tool according to some embodiments of the invention.

In some embodiments, a web designer creating a web page uses the web composition tool to determine the visibility of portions of the web page. By using the composition tool, a web designer can create the web page so that important or valuable content is immediately visible to the majority of users without requiring the users to scroll the web page. FIG. 3A illustrates a process for generating a web page composition tool according to some embodiments of the invention. A translucent overlay is displayed over a first web page displayed in a browser (302). The first web page is visible through the translucent overlay and can be any web page or a web page under development by a web designer. The size of the translucent overlay corresponds to the size of the browser frame or iframe in which the first web page is displayed or the size of the viewable portion of the web browser window. The opacity of the translucent overlay can range from opaque to transparent. In some embodiments, the translucent overlay is generated by the translucent overlay module (FIG. 1A, 114) in response to a user initiate request for a translucent overlay. In some embodiments, the translucent overlay is automatically generated and stored in the user statistics database (FIG. 1A, 116) without any user initiated actions. In some embodiments, the translucent overlay is generated at the server system (FIG. 1A, 106) and sent to the designer client (FIG. 1A, 103). In some embodiments, the designer client 103 receives browser size distributions 127 from the server system (FIG. 1A, 106) to generate the translucent overlay.

In some embodiments, the first web page is displayed within a second web page having one or more controls (304). For example, as shown in FIG. 4A, the first web page 420 is displayed as frame or iframe within the second page 416. The controls (FIG. 4A, 410) are provided via a graphical user interface (GUI) displayed to a user. For example, as shown in FIG. 4A, the controls could be buttons 410-2, fields 410-1, and selection boxes 410-3. It is noted that the translucent overlay is displayed over the first web page and not displayed over the second web page having one or more controls. In some embodiments, the one or more commands corresponding to the controls are entered through a command line interface. The one or more controls help a web designer adjust the translucent overlay to provide more meaningful information.

In some embodiments, the one or more controls 410 of the second page 416 include controls that enable a web designer to navigate the first web page to designated web pages (308). In some embodiments, the translucent overlay displayed over the first page updates after a new page is loaded. For example, the size, shape, location and colors of the distinct regions of the translucent overlay and the percentage values corresponding to the distinct regions may be updated based on browser sizes statistics associated with the new web page.

In some embodiments, the second web page 416 includes one or more controls 410-2 to allow a web designer to change an adjustable opacity level of the translucent overlay (306). The opacity level of the translucent overlay can be adjusted to different levels ranging from transparent to opaque.

In some embodiments, the second web 416 page further includes controls 410-5 to enable a web designer to resize the first web 420 page to a respective size corresponding to a portion of the community of users that use the browsers at the respective size or larger (310). In other words, a web designer can select or input a percentage value and the browser window will be resized to reflect the view that is used by a portion of the community of users or at least the selected portion of the community of users. For example, if a web designer inputs or selects a percentage of 40% the web browser window is resized such that the frame displaying the first web page 420 is resized to 900 pixels by 450 pixels (which is a browser size that at least 40% of the users have).

In some embodiments, the one or more controls 410 include controls 410-3 to enable a web designer to select the data used to generate the translucent overlay. In some embodiments, a web designer selects a community of users 410-3. The browser size statistics 126 and browser size distributions 127 for the selected community of users are used to determine the size, shape and location of a plurality of distinct regions on a translucent overlay. In some embodiments, the browser size statistics 126 and browser size distributions 127 for the selected community of users are also used to determine a percentage value associated with each distinct region. For example, if a user selects "netbook users" then only browser size statistics and browser size distributions for netbook users are used to generate the plurality of distinct sections of the translucent overlay. In another example, a user can select a specific make (e.g., Asus, Dell) and model (e.g., 1005HA) of a device.

In some embodiments, the second web page includes controls 416 to enable a web designer to select a time period over which the user browser size information 128 was collected.

For example, a user could specify that the browser size information 128 was collected between two dates. In some embodiments, the user can specify events instead of period of times. For example, a user could specify that all browser size information 128 collected since the last full moon is used. The browser size information 128 over the selected period of time is used to generate browser size statistics 126 and browser size distributions 127 used to generate the translucent overlay. In some embodiments, a web designer can specify or that browser size information 128 over a period of time and for a community of users is used. For example, a user may select "netbook users" and a time period consisting of the previous week. The user browser size information collected during the previous week for netbook users and would then be used to determine the plurality of distinct sections of the translucent overlay. Thus, a web designer is able to tailor to translucent overlay to correspond to any period of time.

A plurality of visually distinct sections are displayed on the translucent overlay (312). Each distinct section corresponds to a plurality of hypothetical browser sizes used to view the first web page (312). For example, a respective section may correspond to browser sizes of 900 pixels by 400 pixels to 900 pixels by 450 pixels. As shown in FIG. 4B, the sections 422 and 424 are non-overlapping (314). In some embodiments, each visually distinct section has a distinct color (318) or other distinct visual attributes (e.g., patterning). The contents of the web page underneath the translucent layer are visible through the distinct sections.

In some embodiments, the size, shape and location of the distinct regions are determined using browser size distributions 127. In some embodiments, as shown in FIGS. 2D-1, browser size distributions are stored as a browser size distribution data structure 202. In some embodiments, the browser size statistics data structure 202 is a two-dimensional array with each position or slot storing a distribution value for a respective browser size or groups of browser sizes. In some embodiments, each slot of the browser size statistics data structure 202 contains a percentage value indicating the portion of the associated community of users that have a browser size smaller than the largest browser size associated with the slot. In some embodiments, the percentage value indicates the portion of the associated community of users that cannot see a given location. In some embodiments, each slot of the browser size statistics data structure 202 contains a percentage value indicating the portion of the community of users that have a browser size at least as large as the smallest browser size associated with a slot. In some embodiments, the percentage value indicates the portion of the associated community of users that can see a given location.

FIGS. 2D-1, 2D-2, 2D-3 and 2D-4 help illustrate how the size, shape and location of the distinct regions of a translucent overlay are determined. Slots are grouped based on their respective values to form region groups. For example, slots containing values from 90% to 100% could be a region group. For example, as shown in FIGS. 2D-1, the region group 250 consists of slots (0-50 by 0-50, 0-50 by 51-100, 51-100 by 0-50 and 51-100 by 51-100) containing values from 90% to 100%. As shown in FIGS. 2D-1, the region group 251 includes slot containing values 80% to 89%. As shown in FIGS. 2D-1, the region group 252 includes slots containing values from 70% to 89%. The size, shape and location of each region group corresponds to the size, shape and location of each distinct region of a translucent overlay. Reducing the size of the browser size groupings results in more contoured distinct regions. For example, instead of grouping browser sizes by 50 pixels (0-50 by 0-50) the browser sizes could be grouped by 10 pixels (0-10 by 0-10).

In each distinct section, a percentage corresponding to a portion of a community of users that can see a portion of a respective section is displayed (320). In some embodiments, the displayed percentage is the portion of the community of users that have a browser size that is at least as large as the smallest browser size associated with a respective section. For example, as shown in FIG. 4B, a percentage value of 90% (426) indicates that 90% of the community of users have a browser size at least as large as the smallest browser size associated with the distinct section (800 by 250 pixels). Thus, at least 90% of the community of users can see the content of the first page corresponding to the distinct section.

In some embodiments, the percentage value is determined from browser size statistics 126 for a community of users (322). In some embodiments, the percentage value is determined from browser size distributions 127 for a community of users. In some embodiments, the browser size statistics for the community of users is stored in a two dimensional array (324).

FIGS. 2D-1, 2D-2, 2D-3 and 2D-4 help illustrate how the percentage value is determined for each distinct region. As shown in FIGS. 2D-1, region groups 250, 251 and 252 are formed based on ranges of values. For example, slots containing values from 90% to 100% are put into a region group. After the region groups are determined, each region group is assigned a percentage value. In some embodiments, this percentage value is stored in a region value data structure. In some embodiments, the percentage value for each region group is the highest percentage value of a slot contained in the region group. For example, as shown in FIGS. 2D-2, the percentage value for region group 250 is 98%. As shown in FIGS. 2D-3, the percentage value for region group 251 is 89%. As shown in FIGS. 2D-4, the percentage value for region group 252 is 79%. In some embodiments, the percentage value represents the portion of the community of users that can see the smallest browser size in a distinct region. In some embodiments, the percentage value represents the portion of the community of users that cannot see the largest browser size in a distinct region.

In some embodiments, the translucent overlay (FIG. 1A, 114) retrieves browser size statistics 127 from the user statistics database (FIG. 1A, 116) to determine the size, shape and locations of distinct regions of a translucent overlay. In some embodiments, the translucent overlay module (FIG. 1A, 114) uses user browser size information 128 or browser size statistics 126 to generate browser size distributions 127.

In some embodiments, the browser size distributions 127 for a community of users is periodically determined and stored in the user statistics data base (FIG. 1A, 116). In some embodiments, the browser size distributions 127 are determined in response to a request for a translucent overlay.

In some embodiments, a grid is displayed on the translucent overlay (326). In some embodiments, pixel gradations are displayed in association with the grid lines to identify respective browser sizes (328).

Using the composition tool, a web designer can concurrently view the contents of a first web page through a translucent overlay, information relating to user browser sizes (that is displayed on a translucent overlay) and controls to tailor the data used to generate the information displayed on the translucent overlay. The information displayed on the translucent overlay (e.g., distinct sections, percentage values, grid lines, pixel gradations) indicates to a web designer the portion of users that can or cannot see a portion of the first web page. For example, by looking at a portion of the first web page a web designer can see, by looking at the information displayed on the corresponding distinct section of the translucent overlay, the respective browser sizes necessary to view the portion of the first web page and the percentage of users who have such browser sizes. In addition, by implication or by changing one or more controls for the translucent overlay, the web designer can view the distinct section of the translucent overlay and see the percentage of users that cannot view the respective portion of the first web page displayed underneath the distinct section of the translucent overlay.

In some embodiments, a web designer can interact with the web page displayed underneath the translucent overlay. In some embodiments, an opening in the translucent overlay positioned below a cursor is displayed enabling a web designer to interact with elements of the web page shown in the opening (330). The opening can be of any size or shape. As the cursor is moved, the opening in the translucent overlay is automatically updated to be positioned below the cursor. In some embodiments, the translucent overlay consists of multiple divs which are positioned such that an opening is automatically positioned below the cursor. The translucent overlay is maintained as the web designer navigates the web page that is underneath the translucent overlay. In some embodiments, the opening does not follow the cursor and the web designer can position the opening at any location on the translucent overlay. In some embodiments, a web designer can resize the opening. In some embodiments, the translucent overlay is updated as the web designer navigates through the web site. For example, the size, shape and location of the distinct regions may be updated to use browser size statistics for the community of users corresponding to the web page the web designer has navigated to. Any value associated with the translucent overlay can be updated as the web designer navigates to new web pages.

Allowing a web designer to navigate through a website consisting of multiple web pages helps the web designer simulate a user's web browsing experience. Using this tool a web designer can more effectively tailor the content of a web site so that a user immediately sees important content as the user navigates through the web site. For example, a web designer may want to ensure that certain buttons or text are always visible as a user clicks through a web site. The web designer may also want to ensure that certain links or content is more visible to steer the user a certain direction as the user navigates for a web site. For example, a link to purchase items may also be visible to a user as the user navigates through the web site.

Attention is now directed towards FIG. 4A which is a schematic screenshot of a web browser window 402 presenting web page 416 and frame 420, in accordance with some embodiments of the invention. The web browser 402 can be any type of browser application that permits a user to display and interact with web pages or other documents. The web browser's user interface includes URL field 404 for entering the URL of any web page that a user wants to display, as well as for displaying the URL of the web page currently being displayed.

The web page 416 includes controls (410-1, 410-2, 410-3, 410-4, 410-5) to allow a web designer to: navigate frame 410 to any webpage, to change the opacity of the translucent overlay, to select a community of users that the translucent overlay will be generated for, to select a time period over which user browser size information for the community of users was collected and a percentage value corresponding to a browser size used by a portion of the community of users.

The web page 416 includes URL field 410-1 for entering the URL of any web page that a user wants to display in the frame 420. In some embodiments, URL field 410-1 also displays the URL of the web page currently being displayed in frame 420. It is noted that the URL for the web page that displays controls 410 is displayed in field 404.

As shown in FIG. 4A, the second web page 416 includes several selectable levels of opacity 410-2 ranging from transparent to opaque. In response to a user selection of an opacity level, the opacity of the translucent overlay displayed in frame 420 is updated to reflect the change.

Web page 416 further includes controls 410-5 to change the size of the web page displayed in frame 420 to correspond to a browser size used by at least a portion of the community of users. The controls 410-5 include selectable percentages. Each percentage corresponds to a browser sized used by at least a portion of the community of users. For example, 40% could correspond to a browser size of 900 by 450 pixels. If a user selects 40% then the browser 402 will be resized to show the web page displayed in frame 420 at a size corresponding to a browser size at least 40% of the community users have.

In some embodiments, the web page 416 includes a field 410-4 to enter a period of time corresponding to the period of time in which the user browser size information 128 was collected. Browser size statistics corresponding to the entered time period are used to generate the distinct sections of the translucent overlay.

In some embodiments, web page 416 includes controls 410-5 to select a community of users. Browser size statistics 126 or browser size distributions 127 associated with the community of users are used to determine a plurality of distinct regions on a translucent overlay displaying over frame 420. Various communities of users can be selected. For example, if "Netbook users" are selected then only browser size statistics and/or browser size distributions for users using netbooks are used to determine the size, shape and location of the plurality of distinct sections of the translucent overlay displayed over frame 420. In some embodiments, in response to user selection of a community of users, the distinct sections of the translucent overlay are redisplayed in accordance with the browser size statistics of the selected community.

In some embodiments, the controls 410 are set to default settings. For example, the URL field 410-1 could initially be set to display nothing. The controls 410-3 to select a community of users could be initially set to "all users." The controls 410-4 to defining a time period over which the user browser size information was collect could be set such that all browser user size information is used regardless of when it was collected. The controls 410-5 could be initially set to 40%.

FIG. 4B is an exemplary screenshot of the web composition tool as seen by a web designer. The appearance of the translucent overlay 420 reflects the settings (as shown in FIG. 4A) selected by a web designer. FIG. 4B illustrates web browser window 402 presenting web page 416, second web page in frame 420 and translucent overlay 430, in accordance with some embodiments of the invention. It is noted that FIG. 4B illustrates two web pages or frames. The first webpage or frame displays controls 410-1, 410-2 and 410-5. The second web page or frame 420 displays the webpage specified by URL field 410-1. In this example, the translucent overlay, displayed over the second web page, consists of one or more divs and is thus a part of the second web page.

The translucent overlay 430, in FIG. 4B, has a plurality of distinct non-overlapping sections 424, 422 and 426. In some embodiments, each distinct section of a translucent overlay is distinctly colored or shaded. In some embodiments, each distinct section of a translucent overlay is not colored or shaded. For example, the size, shape and location of the distinct sections of a translucent overlay could be indicated by contour lines. For example, as shown in FIG. 4A, 420, the size, shape and location of the distinct sections may be distinguished by contour lines 421. It is noted that the distinct sections in FIGS. 4A, 4B and 4C could be uncolored and the size, shape and location of the distinct sections could be indicated by contour lines. The contour lines could be of any size, shape or color. It is noted that the translucent overlay and the distinct sections of the translucent overlay still have an adjustable level of opacity and the web page underneath the translucent overlay is visible. As shown in FIG. 4B, each section, further includes a percentage value 426. In some embodiments, the percentage value 426 indicates the portion of the community of users that have a browser size at least as large as the smallest browser size associated with a respective section of the translucent overlay. For example, the section 426 with a percentage of 80% indicates that 80% of the users have a browser size at least the size of the smallest browser size associated with the section. In other words, 80% of users can see the portions of the webpage smaller than the browser size corresponding to 80%. Stated in another way, for the 80% section, any part of the web page that appears within that section can be seen by at least 80% of the website visitors. In some embodiments, the percentage value 426, in FIG. 4B, indicates the portion of the community of users that have a browser smaller than the smallest browser size associated with a respective section of the translucent overlay.

In some embodiments, the translucent overlay 430 includes a grid and pixel gradations (428 and 432) to help a web designer identify how respective browser sizes correspond to different distinct regions. In some embodiments, the pixel gradations identify width and heights for browser and a corresponding distinct section of the translucent overlay. For example, a width of 800 pixels and height of 450 pixels corresponds to a distinct section of the translucent overlay containing the percentage value of 30%. Thus, for any given point on a translucent overlay, the content of the web page underneath the overlay is apparent, the size of the browser needed to view the content is apparent, the percentage of users that have a browser size corresponding to the given point is apparent, and the percentage of users that can view the content of the web page at the given point is apparent.

Figure 4C:
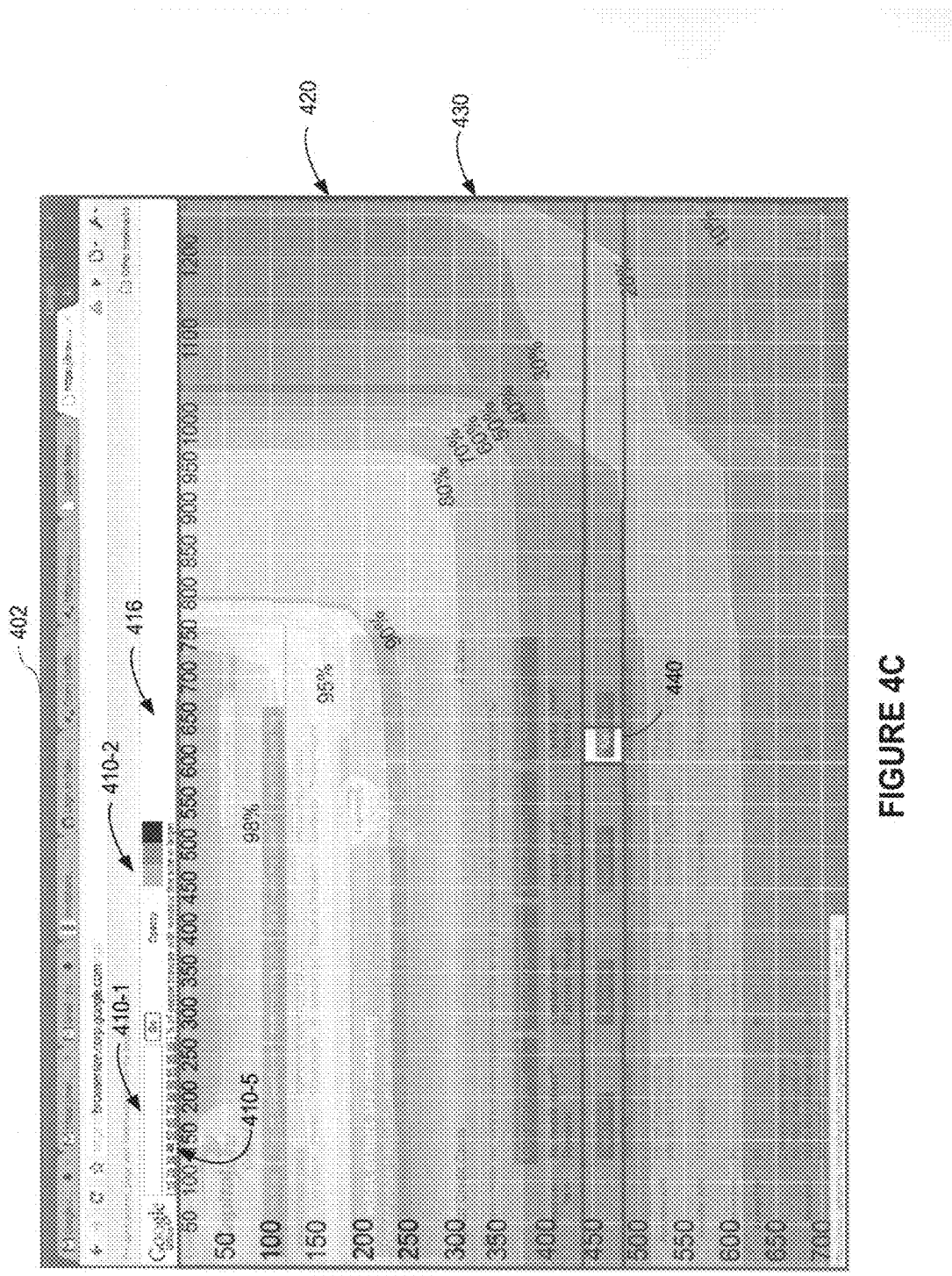

FIG. 4C is an exemplary screenshot of a web browser window 402 presenting web page 416, second web page in frame 420 and translucent overlay 430, in accordance with some embodiments of the invention. The translucent overlay 430 has an opening 440 that enables a user to interact with the elements of the second web page 420. In some embodiments, the opening 440 is positioned below a cursor (not shown) and continually repositioned as the cursor is moved. The opening 440 can be of any size or shape. The second web page in frame 420 is updated in response to user selections of elements of the second web page.

Figure 5:
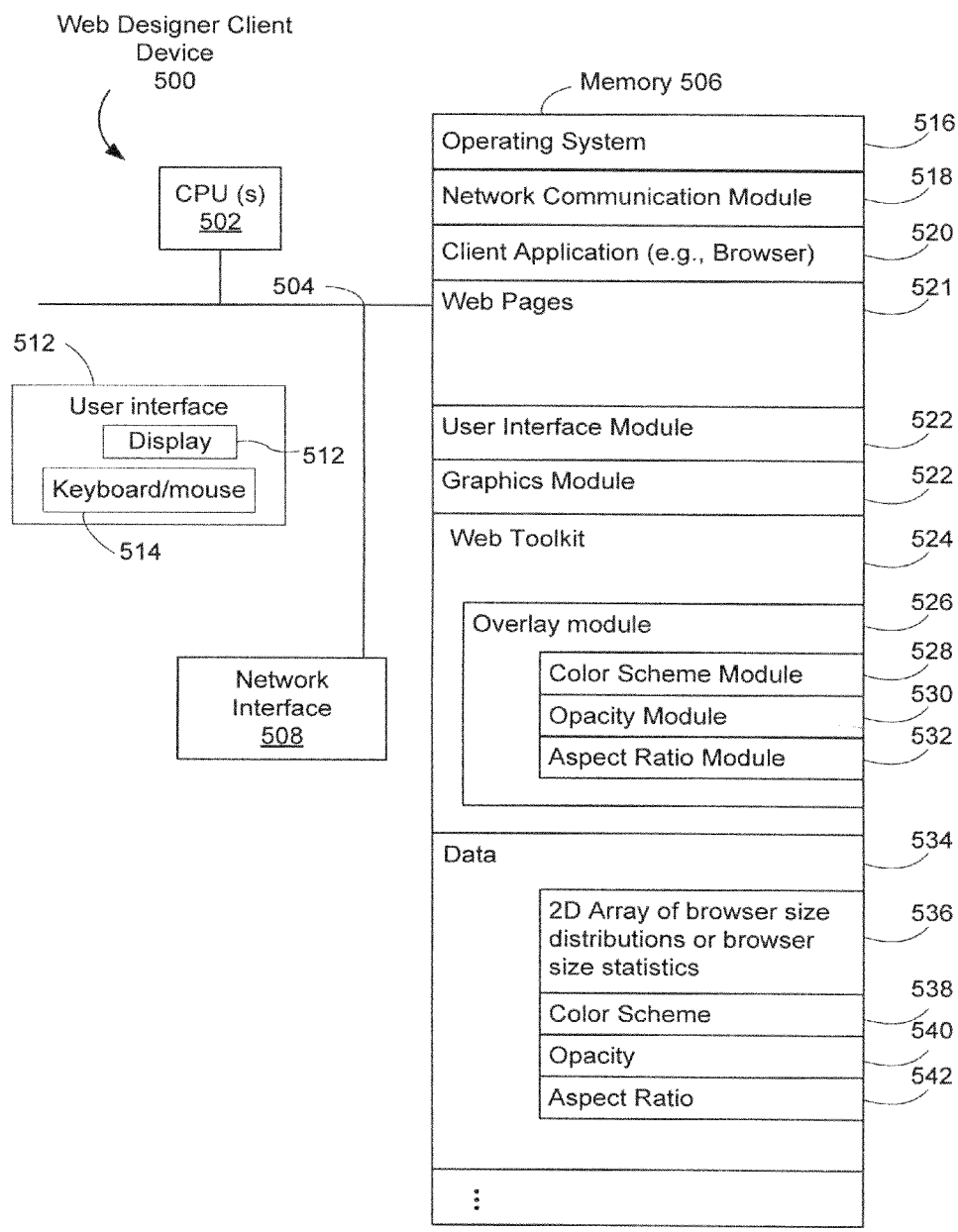
FIG. 5 is a block diagram illustrating the structure of an exemplary web designer client computer according to some embodiments of the invention.

FIG. 5 is a block diagram illustrating a web designer client device 500, in accordance with one embodiment of the present invention. The web designer client device 500 typically includes one or more processing units (CPU's) 502, one or more network or other communications interfaces 508, memory 506, and one or more communication buses 504 for interconnecting these components. The client device 500 may also include a user interface comprising a display device 512 and a keyboard and/or mouse (or other pointing device) 514. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPU(s) 502. Memory 506, or alternatively the non-volatile memory device(s) within memory 506, comprises a computer readable storage medium. In some embodiments, memory 506 or the computer readable storage medium of memory 506 store the following programs, modules and data structures, or a subset thereof:

- an operating system 516 that includes procedures for handling various basic system services and for performing hardware dependent tasks;
- a network communication module 518 that is used for connecting to other computers via the one or more communication network interfaces 508 (wired or wireless) and one or more communication networks, such as the Internet, other wide area networks, local area networks, metropolitan area networks, and so on;
- a client application (or instructions) 520, such as a web browser application, for receiving a user request for a document and rendering the requested document on a computer monitor or other user interface device;
- web pages 521 which can be translucent overlays or web pages over which a translucent overlay may be placed;
- a user interface module to display a graphical user interface and to track user selections; the graphical user interface includes controls to allow a user to modify settings of the translucent overlay;
- a graphics module to display the translucent overlay;
- a web tool kit 524 that includes an overlay module 528 that that uses data 534 to generate a translucent overlay; a color scheme module 528 to determine the color of the distinct regions of a translucent overlay according to a color scheme 538; an opacity module 530 to adjust the opacity of the translucent overlay using opacity data 540; an aspect ratio module 532 to determine and change the aspect ratio of the translucent overlay according to aspect ratio data 542; and
- a data 534 that includes one or more two dimensional arrays 536 that contain browser size statistics and/or browser size distributions; color scheme data 538 for determining colors of the distinct regions of a translucent overlay; opacity data 540 for displaying translucent overlays at certain levels of opacity; aspect ratio data 542 for determining the shape of the visually distinct regions of the translucent area. In some embodiments, data 534 is stored on the server system 106.

Each of the above identified elements may be stored in one or more of the previously mentioned memory devices, and each of the modules or programs corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 506 may store a subset of the modules and data structures identified above. Furthermore, memory 506 may store additional modules and data structures not described above.

Although FIG. 5 shows a web designer client system, FIG. 5 is intended more as functional description of the various features which may be present in a set of clients than as a structural schematic of the embodiments described herein. In practice, and as recognized by those of ordinary skill in the art, items shown separately could be combined and some items could be separated. For example, some items (e.g., client application 520 and client assistant 522) shown separately in FIG. 5 could be implemented on a single client and single items could be implemented by one or more clients.

Figure 6:
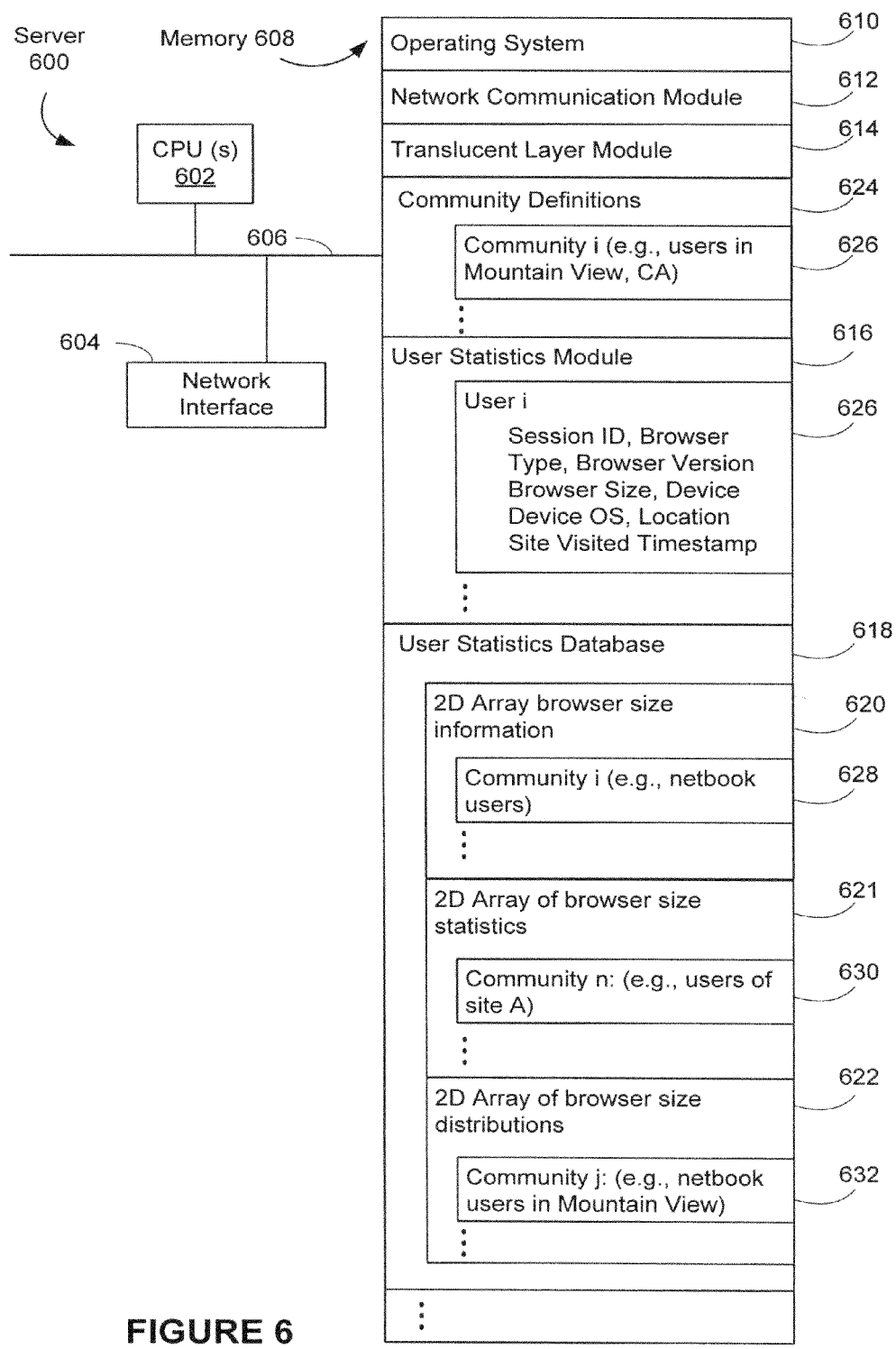
FIG. 6 is a block diagram illustrating the structure of an exemplary server computer according to some embodiments of the invention.

FIG. 6 is a block diagram illustrating a server system 500, in accordance with one embodiment of the present invention.

The server 500 typically includes one or more processing units (CPU's) 602, one or more network or other communications interfaces 604, memory 608, and one or more communication buses 606 for interconnecting these components. Memory 608 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 608 may optionally include one or more storage devices remotely located from the CPU(s) 602. Memory 608, or alternatively the non-volatile memory device(s) within memory 608, comprises a computer readable storage medium. In some embodiments, memory 608 or the computer readable storage medium of memory 608 store the following programs, modules and data structures, or a subset thereof:

- an operating system 610 that includes procedures for handling various basic system services and for performing hardware dependent tasks;
- a network communication module 612 that is used for connecting to other computers via the one or more communication network interfaces 604 (wired or wireless) and one or more communication networks, such as the Internet, other wide area networks, local area networks, metropolitan area networks, and so on;
- a translucent overlay module 614 that uses browser size statistics 621 or browser size distributions 622 stored in the user statistics database 618 to generate translucent overlays;
- a community definitions 624 that contain a plurality of community of definitions 626 (e.g., users in Mountain View, Calif.);
- a user statistics module 616 that collects user browser size information 128, generates two dimensional arrays, determines browser size distributions 622 and browser size statistics 621; stores browser size distributions 622, browser size statistics 621 and browser size information 620 in the user statistics database 618; the user statistics module receives browser size information for users 626; the browser size information includes (as described in FIG. 2A, 219) session id, browser type, browser size, device, device operation system, location, site visited and timestamp; and
- a user statistics database 618 that stores one or more two dimensional arrays of browser size information 620, browser size statistics 621 and browser size distributions 622; each array 620, 621 and 622 includes information corresponding to one or more community of users such as net book users 628, users of a particular site 630 and netbook users in Mountain View 632.

Each of the above identified elements may be stored in one or more of the previously mentioned memory devices, and each of the modules or programs corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 608 may store a subset of the modules and data structures identified above. Furthermore, memory 608 may store additional modules and data structures not described above.

Although FIG. 6 shows a server, FIG. 6 is intended more as functional description of the various features which may be present in a set of servers than as a structural schematic of the embodiments described herein. In practice, and as recognized by those of ordinary skill in the art, items shown separately could be combined and some items could be separated. For example, some items (e.g., translucent overlay module 614, user statistics module 616 and user statistics database 618) shown separately in FIG. 6 could be implemented on single servers and single items could be implemented by one or more servers. The actual number of servers used to implement the server system 500 and how features are allocated among them will vary from one implementation to another, and may depend in part on the amount of data traffic that the system must handle during peak usage periods as well as during average usage periods.

Figure 3B:
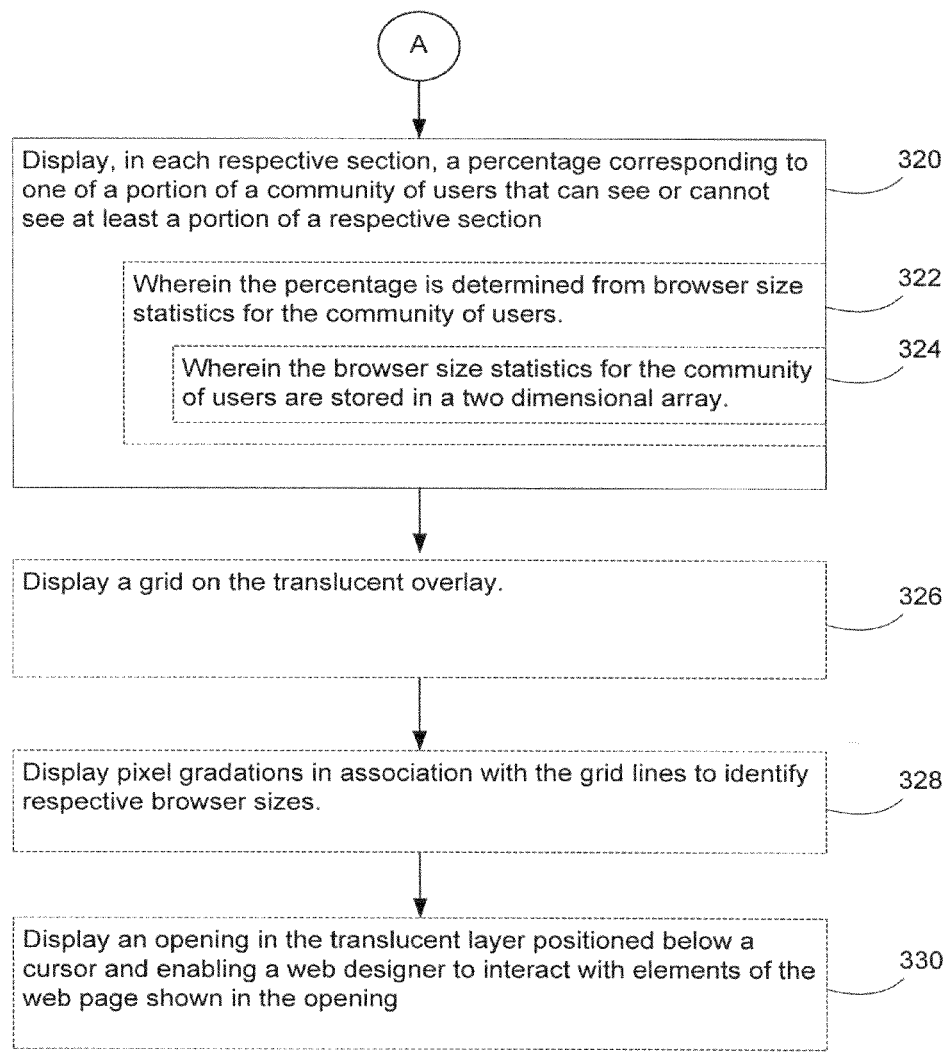

Each of the methods described herein may be governed by instructions that are stored in a computer readable storage medium and that are executed by one or more processors of one or more servers. Each of the operations shown in FIGS. 3A-3B may correspond to instructions stored in a computer memory or computer readable storage medium.

Figure 7:
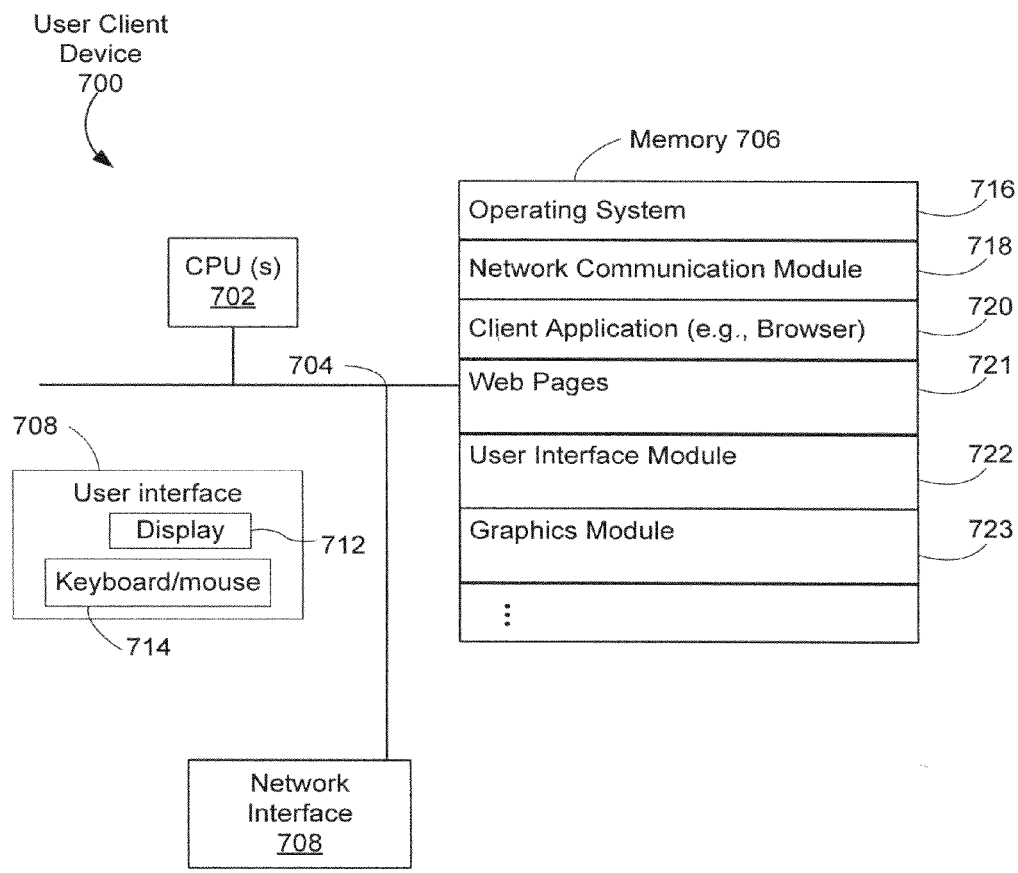
FIG. 7 is a block diagram illustrating the structure of an exemplary user client computer according to some embodiments of the invention.

FIG. 7 is a block diagram illustrating a user client device 700, in accordance with one embodiment of the present invention. The user client device 700 typically includes one or more processing units (CPU's) 702, one or more network or other communications interfaces 708, memory 714, and one or more communication buses 704 for interconnecting these components. The user client device 700 may also include a user interface comprising a display device 712 and a keyboard and/or mouse (or other pointing device) 714. Memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 706 may optionally include one or more storage devices remotely located from the CPU(s) 702. Memory 706, or alternatively the non-volatile memory device(s) within memory 706, comprises a computer readable storage medium. In some embodiments, memory 706 or the computer readable storage medium of memory 506 store the following programs, modules and data structures, or a subset thereof:

- an operating system 716 that includes procedures for handling various basic system services and for performing hardware dependent tasks;
- a network communication module 718 that is used for connecting to other computers via the one or more communication network interfaces 708 (wired or wireless) and one or more communication networks, such as the Internet, other wide area networks, local area networks, metropolitan area networks, and so on;
- a client application (or instructions) 720, such as a web browser application, for receiving a user request for a document and rendering the requested document on a computer monitor or other user interface device;
- web pages 721 which can be translucent overlays or web pages over which a translucent overlay may be placed.
- A user interface module 722 for displaying controls and for tracking user selections.
- A graphics module 723 for displaying content such as webpages.

Each of the above identified elements may be stored in one or more of the previously mentioned memory devices, and each of the modules or programs corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 706 may store a subset of the modules and data structures identified above. Furthermore, memory 706 may store additional modules and data structures not described above.

Although FIG. 7 shows a user client system, FIG. 7 is intended more as functional description of the various features which may be present in a set of clients than as a structural schematic of the embodiments described herein. In practice, and as recognized by those of ordinary skill in the art, items shown separately could be combined and some items could be separated. For example, some items (e.g., user interface module 722 and graphics module 723) shown separately in FIG. 7 could be implemented on a single client and single items could be implemented by one or more clients.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
   on a client system:
   displaying a translucent overlay over a first web page displayed in a browser;
   displaying on the translucent overlay a plurality of visually distinct sections, each corresponding to a hypothetical browser size used to view the first web page; and
   in each respective section, displaying a percentage corresponding to one of a portion of a community of users that can see or cannot see at least a portion of a respective section.

2. The method of claim 1, wherein the first web page is displayed within a second web page, the second web page including one or more controls.

3. The method of claim 2, wherein the one or more controls include controls to allow a web designer to change an adjustable opacity level of the translucent overlay.

4. The method of claim 2, wherein the one or more controls include controls to allow a web designer to navigate the first web page to designated web pages.

5. The method of claim 2, wherein the one or more controls include controls to allow a web designer to resize the first web page to a respective size corresponding to a portion of the community of users that use the browser at the respective size or larger.

6. The method of claim 2, further comprising displaying on the translucent overlay a percentage number corresponding to a portion of the community of users that use a respective browser at the same size as the browser.

7. The method of claim 1, further comprising displaying a grid on the translucent overlay.

8. The method of claim 1, wherein the visually distinct sections are non-overlapping.

9. The method of claim 1, wherein each visually distinct section has a distinct color.

10. The method of claim 1, further comprising:
    displaying an opening in the translucent layer positioned below a cursor; and
    enabling a web designer to interact with elements of the first web page shown in the opening.

11. The method of claim 1, further comprising:
    on the translucent overlay, displaying pixel gradations in association with grid lines to identify respective sizes of browsers.

12. The method of claim 1, wherein the browser size statistics for the community of users are stored in a two dimensional array.

13. The method of claim 1, wherein the percentage is determined from user statistics for the community of users, the statistics including a browser size for each respective user in the community of users.

14. The method of claim 1, wherein the size, shape and location of each distinct region is determined by browser size distributions for the community of users.

15. A system, comprising:
    memory;
    one or more processors;
    one or more programs stored in memory and configured for execution by the one or more processors, the one or more programs including instructions for:
    displaying a translucent overlay over a first web page displayed in a browser;
    displaying on the translucent overlay a plurality of visually distinct sections, each corresponding to a hypothetical browser size used to view the first web page; and
    in each respective section, displaying a percentage corresponding to one of a portion of a community of users that can see or cannot see at least the respective section.

16. The system of claim 15, wherein the first web page is displayed within a second web page, the second web page including one or more controls; and
    wherein the one or more controls include controls to allow a web designer to resize the first web page to a respective size corresponding to a portion of the community of users that use the browser at the respective size or larger.

17. The system of claim 15, wherein the first web page is displayed within a second web page, the second web page including one or more controls; and wherein the one or more programs further comprising instructions for:
    displaying on the translucent overlay a percentage number corresponding to a portion of the community of users that use a respective browser at the same size as the browser.

18. The computer readable storage medium storing one or more programs configured to be executed by a computer system, the one or more programs comprising instructions for:
    displaying a translucent overlay over a first web page displayed in a browser;
    displaying on the translucent overlay a plurality of visually distinct sections, each corresponding to a hypothetical browser size used to view the first web page; and
    in each respective section, displaying a percentage corresponding to one of a portion of a community of users that can see or cannot see at least the respective section.

19. The computer readable storage medium of claim 18, wherein the first web page is displayed within a second web page, the second web page including one or more controls;
    and wherein the one or more controls include controls to allow a web designer to resize the first web page to a respective size corresponding to a portion of the community of users that use the browser at the respective size or larger.

20. The computer readable storage medium of claim 18, wherein the first web page is displayed within a second web page, the second web page including one or more controls;

and wherein the one or more programs further comprising instructions for:

displaying on the translucent overlay a percentage number corresponding to a portion of the community of users that use a respective browser at the same size as the browser.

* * * * *

UNITED STATES PATENT AND TRADEMARK OFFICE
CERTIFICATE OF CORRECTION

PATENT NO. : 8,392,841 B1
APPLICATION NO. : 12/653150
DATED : March 5, 2013
INVENTOR(S) : Bowden et al.

It is certified that error appears in the above-identified patent and that said Letters Patent is hereby corrected as shown below:

In the Claims:

In column 22, Claim 18, line 47, please delete "The" and add -- A --.

Signed and Sealed this
Fourteenth Day of May, 2013

Teresa Stanek Rea
*Acting Director of the United States Patent and Trademark Office*